(12) United States Patent
Gerlits

(10) Patent No.: US 11,762,878 B2
(45) Date of Patent: Sep. 19, 2023

(54) SYSTEM AND METHOD FOR A DISTRIBUTED DATABASE

(71) Applicant: Andras Gerlits, Budapest (HU)

(72) Inventor: Andras Gerlits, Budapest (HU)

(73) Assignee: Dianemo Limited LTD, Cork (IE)

( * ) Notice: Subject to any disclaimer, the term of this patent is extended or adjusted under 35 U.S.C. 154(b) by 91 days.

(21) Appl. No.: 17/054,282

(22) PCT Filed: May 8, 2019

(86) PCT No.: PCT/IB2019/053770
§ 371 (c)(1),
(2) Date: Nov. 10, 2020

(87) PCT Pub. No.: WO2019/220269
PCT Pub. Date: Nov. 21, 2019

(65) Prior Publication Data
US 2021/0248157 A1 Aug. 12, 2021

Related U.S. Application Data

(60) Provisional application No. 62/670,921, filed on May 14, 2018.

(51) Int. Cl.
*G06F 16/27* (2019.01)
*G06F 16/21* (2019.01)
*G06F 16/2458* (2019.01)

(52) U.S. Cl.
CPC ............ *G06F 16/27* (2019.01); *G06F 16/219* (2019.01); *G06F 16/2474* (2019.01);
(Continued)

(58) Field of Classification Search
CPC ...... G06F 16/27; G06F 16/219; G06F 16/273; G06F 16/275; G06F 16/278; G06F 16/2474; G06F 16/2477
See application file for complete search history.

(56) References Cited

U.S. PATENT DOCUMENTS 6,850,938 B1 * 2/2005 Sadjadi ............... G06F 16/2315
709/248
7,590,643 B2 * 9/2009 Demiroski ............ G06F 16/178
707/999.102

(Continued)

OTHER PUBLICATIONS

Marz Nathan, How to beat the CAP theorem, Thoughts From the Red Planet, http://nathanmarz.com/blog/how-to-beat-the-cap-theorem. html, Oct. 13, 2011 (19 pages).

(Continued)

*Primary Examiner* — Alford W Kindred
*Assistant Examiner* — Lin Lin M Htay
(74) *Attorney, Agent, or Firm* — Wood Herron & Evans LLP

(57) ABSTRACT

A system and method for a distributed database that is consistent but non-blocking. This distributed database, also referred to as a datastore, has a number of desirable features. Without wishing to be limited by a closed list, these features include but are not limited to: providing strong, ANSI SQL-compatible consistency guarantees; being distributable across multiple computers, data centers and even geographical locations; having a resilient, fault-tolerant architecture, where even failures of multiple different data centers can allow the operation of the datastore to continue seamlessly, depending on the configuration.

15 Claims, 14 Drawing Sheets

(52) U.S. Cl.
CPC ........ *G06F 16/2477* (2019.01); *G06F 16/273* (2019.01); *G06F 16/275* (2019.01); *G06F 16/278* (2019.01)

(56) References Cited

U.S. PATENT DOCUMENTS

| | | | |
|---|---|---|---|
| 2005/0063083 A1* | 3/2005 | Dart | G06F 16/284 360/1 |
| 2012/0102006 A1* | 4/2012 | Larson | G06F 16/1865 707/703 |
| 2017/0154091 A1* | 6/2017 | Vig | G06F 16/90 |
| 2020/0042199 A1* | 2/2020 | Rozas | H04L 67/2842 |

OTHER PUBLICATIONS

Chao Kong et al., Acid Encountering the CAP Theorem: Two Bank Case Studies, 2015, 12th Web Information System and Application Conference (WISA), IEEE, Sep. 11, 2015, (pp. 235-240).

European Patent Office, International Search Report and Written Opinion of the International Searching Authority, International Application No. PCT/IB2019/053770, dated Aug. 20, 2019 (9 pages).

* cited by examiner

SYSTEM AND METHOD FOR A DISTRIBUTED DATABASE

FIELD OF THE INVENTION

The present invention, in at least some embodiments, relates to a system and method for a distributed database, and in particular, to such a distributed database that is consistent but non-blocking.

BACKGROUND OF THE INVENTION

Currently available database systems operating through blocking transactions; that is, by only permitting one transaction at a time for reading or writing specific data. However, this 10 blocking is slow and inefficient, and reduces scalability of the database system.

The blog item of Marz Nathan. "How to beat the CAP theorem" (nathanmarz.com blog, 12 Oct. 2011. URL: http://nathanmarz.com/blog/how-to-beat-the-cap-theorem.html. XP055153842) discloses a data store system for solving the problem of guaranteeing both consistency and availability of a database.

BRIEF SUMMARY OF THE INVENTION

The present invention overcomes the drawbacks of the background art by providing a system and method for a distributed database that is consistent but non-blocking. This distributed database, also referred to as a datastore, has a number of desirable features. Without wishing to be limited by a closed list, these features include but are not limited to: providing strong, ANSI SQL-compatible consistency guarantees; being distributable across multiple computers, data centers and even geographical locations; having a resilient, fault-tolerant architecture, where even failures of multiple different data centers can allow the operation of the datastore to continue seamlessly, depending on the configuration.

This is presented through the idea that sets of resulting data from multiple computers do not necessarily have to be consistent immediately, but that they can be filtered before the results are presented to the client. When looked at this way, the problem can be reduced to making sure that the filtering algorithm references an atomic event which can be deterministically compared to others, and it will result in the same answer anywhere in the system.

According to at least some embodiments, the system and method may comprise a fully optimistic, lockless conflict resolution mechanism and write process, which allows the results of write operations (potentially writing to multiple computers) to be exposed atomically to readers.

According to at least some embodiments, the system and method may comprise an architecture where the internal state of each computer can be reconstructed from the same ordered set of inputs. This allows the whole system (which is the sum of these computers) to be reliably distributed, persisted and generally be made more resilient.

This is different from current systems, where writes either use some form of two-phase commit algorithm (which are inherently blocking) or lack transaction ordering semantics and thus are unable to provide strong consistency guarantees.

In other words: in current database systems, the internal state is protected by certain mechanisms, so that writes and reads can be finished according to their required consistency guarantees. By contrast, for at least some embodiments of the system of the present invention, the internal state of a computer is considered to be the result of an ordered list of input-messages. This means that two computers will always hold the same internal state when this list is consumed by both. This feature means that there can be no race conditions or other sources of ambiguity in the system, which mandates that computers only communicate with each other using asynchronous methods (since race conditions are inherently non-deterministic).

Preferably, the system comprises a distributed, linearly scalable and strongly consistent, SQL-compatible datastore. Without wishing to be limited by a closed list, further desirable features of the system include being distributed, linearly scalable, and strongly consistent.

According to at least some embodiments, there is provided a system where elements of different ordered sets are associated with each other, and from which association an ordering between elements of these sets can be established. Such a system enables a distributed clock to be used as a reference to compare different pieces of information (that is, items or units of data) throughout the system.

These terms are defined as follows. Distributed: The system maintains its information on multiple computers.

Linearly scalable: If additional computers are introduced into the system, its capacity will roughly increase by the ratio of the total capacity of the new computers compared to the total sum of all capacity of the computers utilised in the system before they were added. For example, if the system used 100 computers previously and 10 new computers are introduced, capacity will grow by about 10%.

Strongly consistent: A global ordering exists between each piece of information. The order between these is referred to as "earlier," "later" or "at the same time." The information implementing this ordering is called time. The system will only return results which contain all relevant information introduced earlier or at the same time compared to a chosen point in time, and does not contain any information introduced later than this time.

Implementation of the apparatuses, devices, methods, and systems of the present disclosure involve performing or completing specific selected tasks or steps manually, automatically, or a combination thereof. Specifically, several selected steps can be implemented by hardware or by software on an operating system, of a firmware, and/or a combination thereof. For example, as hardware, selected steps of at least some embodiments of the disclosure can be implemented as a chip or circuit (e.g., ASIC). As software, selected steps of at least some embodiments of the disclosure can be performed as a number of software instructions being executed by a computer (e.g., a processor of the computer) using an operating system. In any case, selected steps of methods of at least some embodiments of the disclosure can be described as being performed by a processor, such as a computing platform for executing a plurality of instructions.

Software (e.g., an application, computer instructions) which is configured to perform (or cause to be performed) specific functionality may also be referred to as a "module" for performing that functionality, and also may be referred to a "processor" for performing such functionality. Thus, processor, according to some embodiments, may be a hardware component, or, according to some embodiments, a software component.

Further to this end, in some embodiments: a processor may also be referred to as a module; in some embodiments, a processor may comprise one or more modules; in some embodiments, a module may comprise computer instructions—which can be a set of instructions, an application, software—which are operable on a computational device (e.g., a processor) to cause the computational device to conduct and/or achieve one or more specific functionality. Furthermore, the phrase "abstraction layer" or "abstraction interface," as used with some embodiments, can refer to computer instructions (which can be a set of instructions, an application, software) which are operable on a computational device (as noted, e.g., a processor) to cause the computational device to conduct and/or achieve one or more specific functionality. The abstraction layer may also be a circuit (e.g., an ASIC) to conduct and/or achieve one or more specific functionality. Thus, for some embodiments, and claims which correspond to such embodiments, the noted feature/functionality can be described/claimed in a number of ways (e.g., abstraction layer, computational device, processor, module, software, application, computer instructions, and the like).

Some embodiments are described concerning a "computer," a "computer network," and/or a "computer operational on a computer network." It is noted that any device featuring a processor (which may be referred to as "data processor"; "pre-processor" may also be referred to as "processor") and the ability to execute one or more instructions may be described as a computer, a computational device, and a processor (e.g., see above), including but not limited to a personal computer (PC), a server, a cellular telephone, an IP telephone, a smart phone, a PDA (personal digital assistant), a thin client, a mobile communication device, a smart watch, head mounted display or other wearable that is able to communicate externally, a virtual or cloud based processor, a pager, and/or a similar device. Two or more of such devices in communication with each other may be a "computer network."

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings.

DESCRIPTION OF AT LEAST SOME EMBODIMENTS

Figure 1A:
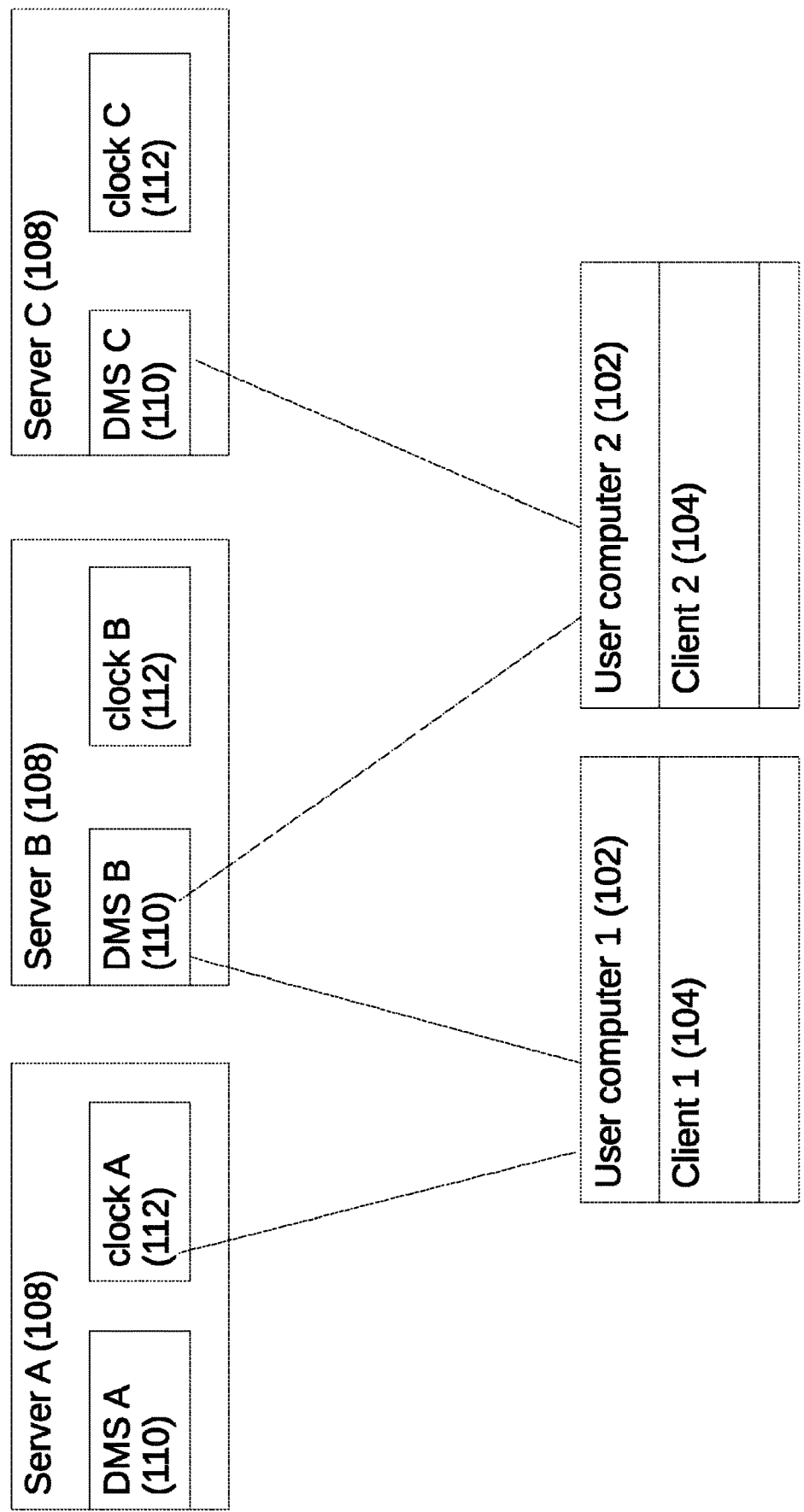
FIGS. 1A and 1B relate to an exemplary, illustrative, non-limiting system for a distributed database according to at least some embodiments of the present invention.
Figure 1B:
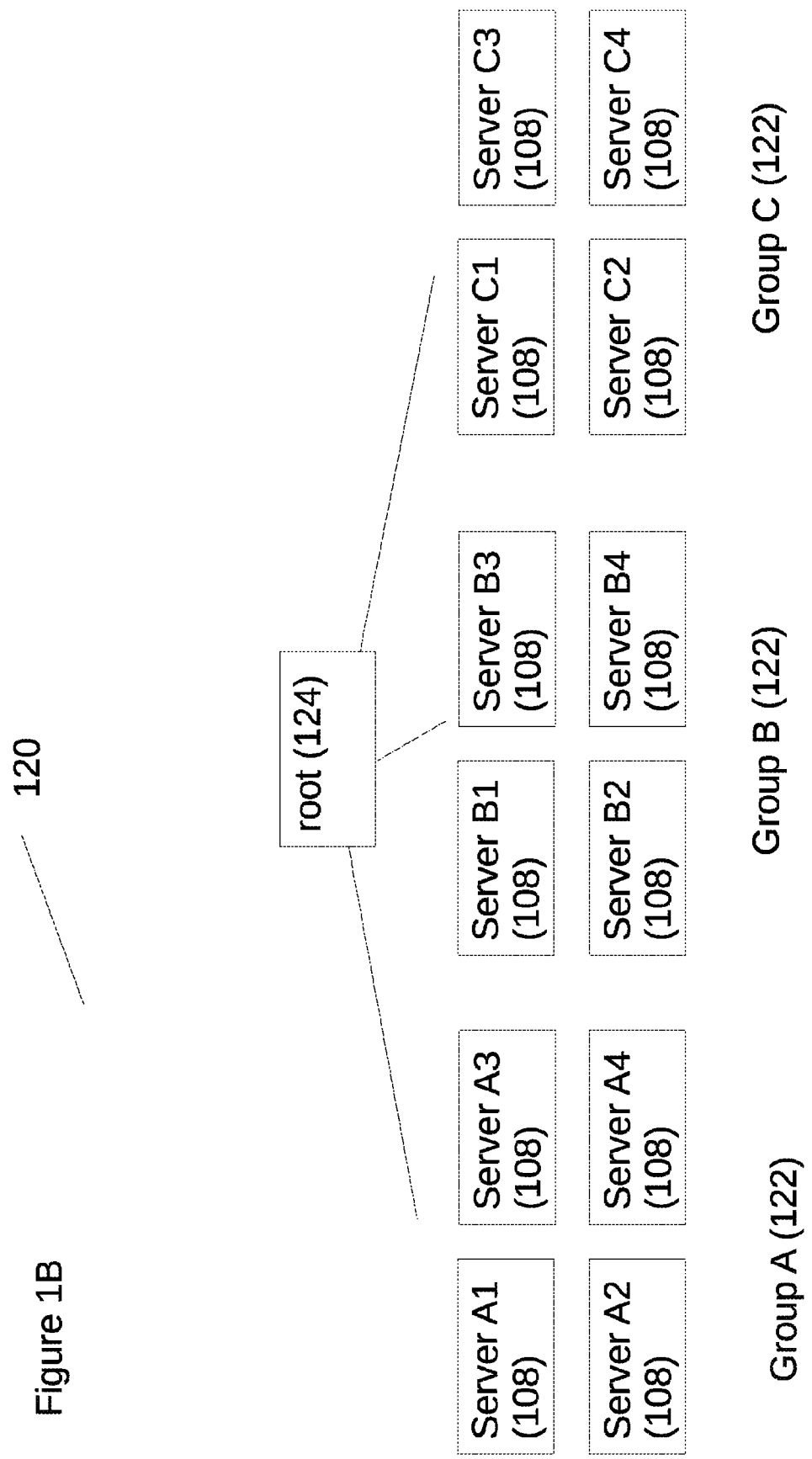

Turning now to the drawings, FIGS. 1A and 1B relate to an exemplary, illustrative, non-limiting system for a distributed database according to at least some embodiments of the present invention. As shown with regard to FIG. 1A, a system 100 features a plurality of servers 108, shown as servers A, B and C for the sake of illustration only and without any intention of being limiting. Each server 108 features a DMS (database management service) 110, also shown as DMS A, B and C for the sake of illustration only and without any intention of being limiting. Each server 108 also features a clock 112, also shown as clocks A, B and C for the sake of illustration only and without any intention of being limiting.

Each server 108 is in communication with at least one user computer 102, shown as user computers 1 and 2 for the sake of illustration only and without any intention of being limiting. Each user computer 102 operates a client 104, shown as clients 1 and 2 for the sake of illustration only and without any intention of being limiting. Client 104 is able to communicate with at least one DMS 110 for reading to and writing from the database system.

FIG. 1B shows the system with regard to a root 124, which is the parent for a plurality of groups 122 in a system 120. Groups 122 are shown as groups A, B and C for the sake of illustration only and without any intention of being limiting. Each group 122 features a plurality of servers 108, labeled according to their group membership, again for the sake of illustration only and without any intention of being limiting. DMS 110 and clock 112 are not shown for the sake of clarity. It is assumed that root 124 also has a clock (not shown).

FIGS. 1A and 1B are now described together. FIGS. 1A and 1B together show an implementation that supports a distributable hierarchical clock. Its goal is to allow computers whose data are closely correlated to have a fast and efficient information exchange mechanism and still allow for a system which could potentially be grown to a global scale in which even remote computers could participate in transactions with strong consistency guarantees and relatively quick response times.

The way these "clocks" are arranged is indifferent from the perspective of the specification. Each clock could be hosted on a specific computer, as shown with regard to FIGS. 1A and 1B, or the clocks could be distributed even further. According to at least some embodiments, a strong ordering can be drawn up between values assumed by a set of distributed clocks by establishing an algorithm which is capable of doing so. Furthermore, such a strong ordering preferably includes the feature that elements of different ordered sets are associated with each other, and from which association an ordering between elements of these sets can be established. Such a system enables a distributed clock to be used as a reference to compare different pieces of information (that is, items or units of data) throughout the system.

Consider a number of computers which send packets of information called clock token-messages between each other in a circle. A set of computers such as this is called a group (see for example FIG. 1B, groups 122). The message contains a natural number which is incremented by one by each computer before passing it on to the next in the chain. In such a setup each computer (as long as it knows its position in the chain) knows which numbers it will receive and which numbers it will send on. The information which is unknown to the computers is the time which will elapse between two token-messages. Since the clock itself is composed of all the participating computers, the group clock is essentially synonymous with the group. Furthermore, each group having its own clock enables the system to operate a distributed clock. The only distinction is a fine one, in that when the group clock is mentioned, a specific ability of the group to create versions is being discussed.

The time window between processing two token-messages is called a period.
- Periods which have finished before the latest token-message was received (i.e., each one except for the last one) are called closed periods.
- The latest period, which will be closed by processing the next token-message, is called an open period.

For example, in a group which contains three computers, the first computer is going to assume the following values: $0=3*0, 3=3*1, 6=3*2 \ldots m=3*k$ where m is the assumed value, k is the number of the period numbered from the start of the message-exchange mechanism. Since each computer knows the latest number it also knows the next one. For example, a period on this computer is the time elapsed between processing the messages containing number 3 and 6; or in other words, the time it takes for all the computers in the chain to complete a whole round of message-passing.

The system never needs to look ahead of the currently open period in any group. This means that if the set of computers needs to change within a group, the new number of computers in the group could potentially be passed along in the message, so that the newly introduced or removed computer can start/stop participating in the message-exchange once the token-messages have gone full circle and reached the node that initiated the start/stop process.

A computer's local clock can be described with the following two attributes:
1. What was the value of the last message received?
2. How many computers will be present in the group in this round?

The period last closed by the receipt of a message is called the group clock value. This is therefore not a global value. To identify it, one needs to know which group is being discussed.

Group clock values are also referred to as versions. Since each period identifies a group clock value, the terms open and closed versions are also used to mean the group clock value identified by the open or closed period.

Given a group of computers, additional groups of computers may be associated with each computer within the group. The computer in the original group will be referred to as the parent or parent computer (such as for example root 124 of FIG. 1B), while the additional group of computers associated to it will be called the child or child group (shown as groups 122 of FIG. 1B). These child groups will have a clock of their own, which will advance independently from the parent's clock. This establishes a tree hierarchy of both computers and groups (as parent computers are also members of groups).

One can define the top of the hierarchy to mean the set of computers which have no parent computers and the bottom or leaf as those which have no children.

It is assumed that communication between computers on the bottom of the hierarchy is orders of magnitude faster than it is between the ones at the top of it.

An ancestor computer is either a parent of a computer or a group, or an ancestor of a parent of a computer or a group. An ancestor group is a group an ancestor computer belongs to. A common ancestor group is a group which is an ancestor group to both of the two specified computers or groups. The lowest common ancestor group or lowest common group clock is the first common ancestor group of two specified computers or groups when searching from bottom to the top (or more formally: the group, included in both sets, which has the highest number of ancestors). The root group is the only group which has no parent and is therefore the top of the hierarchy.

The lowest common ancestor group should always be computable by any computer based on two known versions and the references to their group clocks.

The root group is a common ancestor group to any two groups in the system.

From the child group, a message called value query message containing:
1. The name of the sending computer and
2. A group clock value created by it (which can be either closed or open at this point)

can be sent to the parent computer.

When the parent processes the received message:
- If no value of the parent's clock has been associated with the received one, it returns the currently open period. In the same atomic operation, it also assigns the open period's value to all child-group clock values which are higher than the highest value already queried, up until and including the value present in the message.
- If the received group clock value already has an associated parent-clock value, it returns the associated group clock value.

One can refer to this relation as a child group clock version being associated with the parent-clock version. Associations of versions are bidirectional. Every child version is associated with exactly one parent version however one parent version can be associated with multiple child versions. The association-relation orders child- and group-versions into a tree. The term is also transitively associated when describing a chain of association (potentially involving any number of elements) in a sequence of parent-child relationships.

As an example, take a child group from which value query messages with the values 21, 22 and 23 are sent to the parent. Suppose that there are 3 computers in the parent's group, of which the parent computer is the first one. Let's say the parent receives the values 22 and 21, in this order. When it received 22 in the message, its current open period was 3, so it will associate the child's clock values of 21 and 22 with its own clock's value 3. Once it receives the second message, it will immediately answer 3, since that is a value that has already been associated. Let us also assume that by the time it receives the message containing 23, it is on its next open period (and so 3 is now a closed period), so it will associate 6 with the value 23.

The association described above can be used to implement a global ordering between any two versions. In subsequent flows, strategies are described to decide if a version comes before, after or at the same time as another one.

The "at" or "before operator" is defined recursively as the following: if x and y are two versions in the clock hierarchy and X is the group clock of x and Y is the group clock of y, x is at or before y if x and y are version on the same group clock (X=Y) and y is the same as or earlier than x (y<=x),
X is an ancestor group of Y and there is a y' transitively associated with x and y<=y'

This algorithm defines a top-down search for everything that is either equal to or lower than a chosen version. This is called a weak ordering because no strict order can be established using this algorithm between the elements within the set. This method is also referred to as the weak ordering strategy.

Using this, one can draw up a set of versions which must have been created at the same time, or before the specified version, without having to go deeper into the hierarchy to explore their detailed order.

The strong ordering strategy is:
1. If two versions are from the same group, their values are directly compared.
2. If the two versions are from different groups, their associated value is compared on their lowest common group clock.
3. If on the lowest common group clock, one version is transitively associated with the other and therefore no order could be established this way, the one which is lower in the hierarchy (i.e.: the one which has more ancestors) is the lower one.

The strong ordering is stricter then the weak ordering by the 3) point. These guarantee a deterministic order between any two versions.

Continuing the above example: If one were to ask which values are at or before the parent's group clock's value of 3, it is possible to know that the answer is 21 and 22. If, however one were to ask which ones fulfil the same requirement for 6, the answer cannot be complete as that period is still open and therefore can still accept higher values.

Since there is no guarantee that the parent computer will receive the child group's clock values in order, the answers coming from the parent computer can only be consistent if it does not only consider its current open period, but it also takes its earlier replies into account.

The association between clocks is therefore atomic, since it is defined by when the parent-computer first received a higher value than the highest one stored previously.

Continuing the previous example, if:
The last value received on the parent from the child clock was 22,
The next one was 27,
The current open period's value is 6,
Then the value 6 on the parent's group clock will be associated with every natural number between 23 and 27.

Imagine a group which includes 3 computers, A, B and C, as shown in FIG. 1A. Each of them has an associated child group named after the parent computers, so group A, group B and group C, respectively, as shown in FIG. 1B.

FIGS. 1C-1F relate to exemplary, illustrative, non-limiting flows for a distributed database according to at least some embodiments of the present invention. These flows relate to servers A, B and C and/or groups A, B and C as appropriate.

Figure 1C:
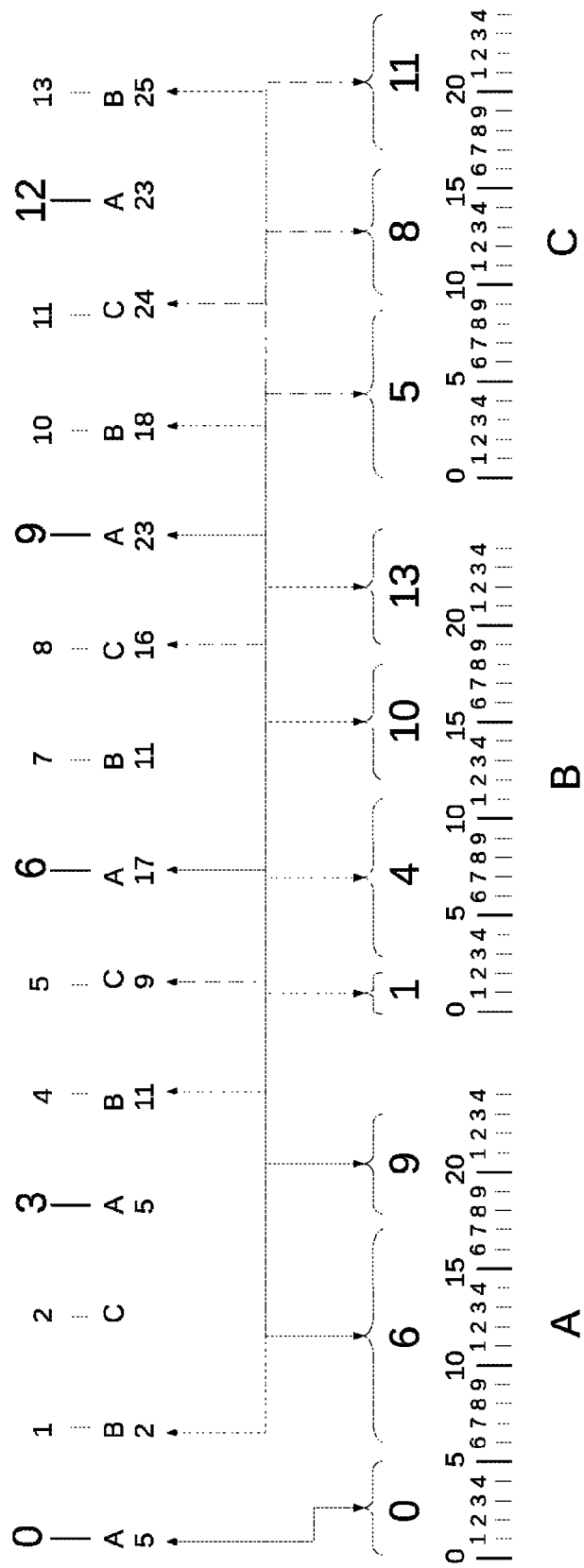
FIGS. 1C-1F relate to exemplary, illustrative, non-limiting flows for a distributed database according to at least some embodiments of the present invention.

FIG. 1C shows possible association of version nodes between the described groups. The illustration here shows a possible result of the group clock's independent execution and the value query messages which associate the versions of the 4 independent clocks.

In the upper half, in the first column, from top to bottom:
The number in the top row is the value of the group clock. So, the first value is 0. The values received by A are shown with a larger number to show at which points the cycle started again.
The A underneath 0 shows that the value is associated with a value of the group clock of group A.
The number 5 under the A shows that the parent group's value of 0 is associated with version 5 of group A.

The second column is computer B receiving its first message from computer A, the third one is computer C receiving its first message from computer B and so on.

The lower half shows the three independent group clocks. These are denoted by their parent computer's names, so they are labelled as A, B and C in the bottom row.

The leftmost curly bracket above the segment 0 and 5 shows the values of group A associated with computer A's 0 period. The arrows show an association-message that was sent to the parent computer from its child group. The leftmost arrow is the first one, where the parent was A, and the message contained group A's clock value of 5. To help differentiate between them, each group has a different style for the line of the arrow. Group A has a solid line, B has a dotted line and C has a double-dotted-triple-dashed line.

Assume that a client's purpose for using the clock is that it should always be able to decide which clock values happened at or before (or inversely, after) a specific time. First, say that the client uses the root group clock, so when it poses this question, the read operation's reference value (against which all others are compared) belongs to the root group clock.

Figure 1D:
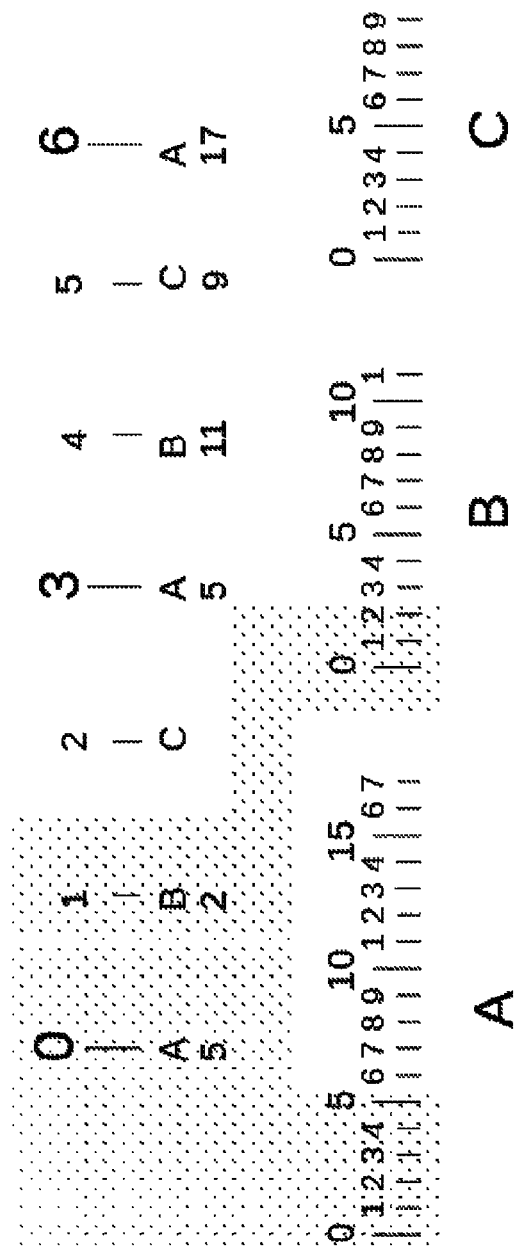

FIG. 1D shows which values will be at or before if the reference value is 1. The dotted area represents the clock values which are at or before the root group clock's value of 1. The values included from group A are the ones between 0 and 5, for group B, between 0 and 2. Nothing is included from group C. The reason for this is that even though the child groups' clocks advance independently from their parent clocks, their advancing determine which values will be assigned from the child groups to the parent group. Group B's group clock's value is 3. The values between 0, 1 and 2 were created before computer B received its first token-message. For a client looking in from the outside, these values represented by group B will first be visible after the computer B processed its first token-message, even if the computer B has processed the values sent by group B earlier. Thus, the client will receive the values represented by the dotted area, as the ones which are at or before value 1 on the root group clock.

Figure 1E:
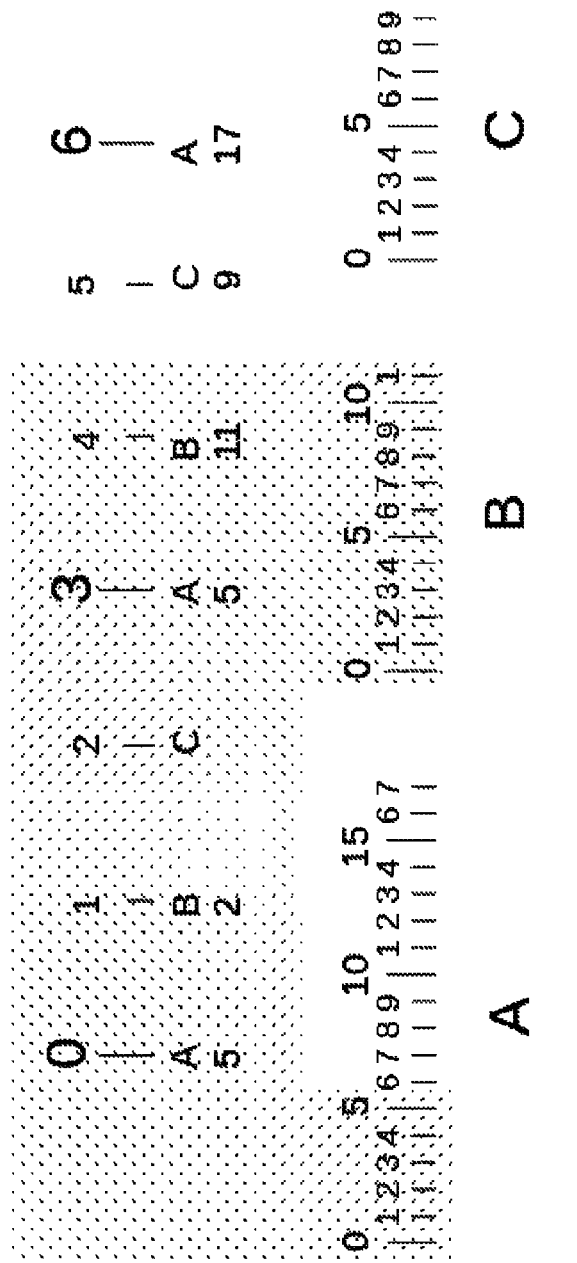

FIG. 1E illustrates the state of all group clocks after the next round (of passing the token messages) has finished. Since in the previous figure the root group clock assumed the position 1 and since there are 3 computers in the root group, the clock's value is 4. If one compared the dotted area in this figure with the one above, one can tell that neither group A nor group C provided new values during last round. Group B, however, has extended its set of values since the previous cycle, and now includes values between 3 and 11. This illustrates that group clocks do not assume that child groups associate new values in each round to their parents.

Figure 1F:
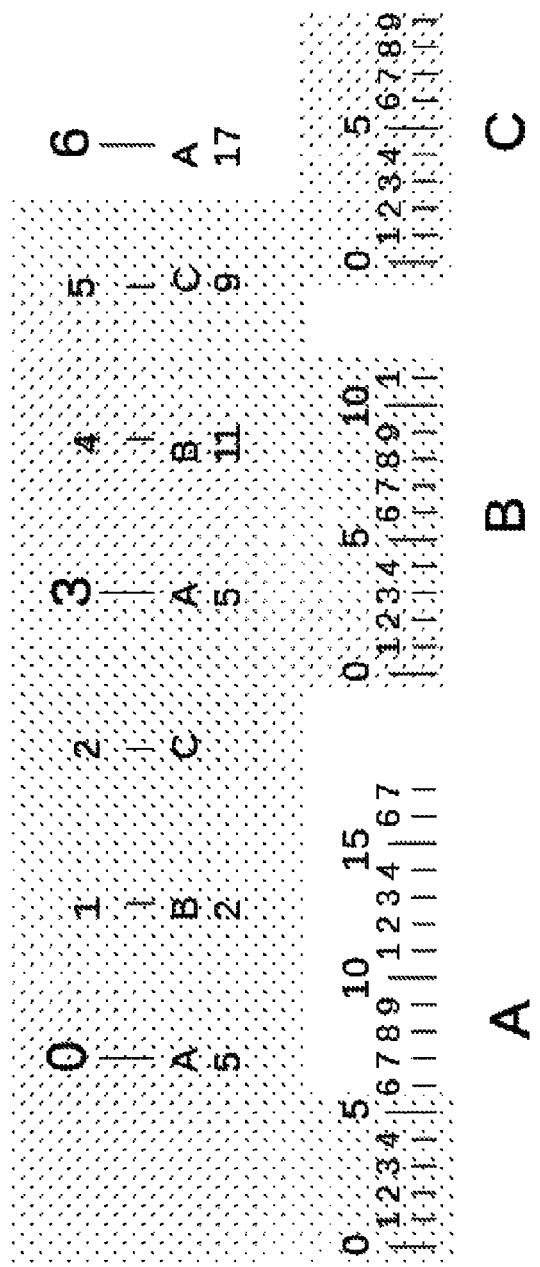

FIG. 1F shows the state after the next value was assumed on the root group clock. Compared to the previous figure, the only change is that the next computer in line (computer C) has processed the token-message it received from child group C. Based on this, one can tell that while group clock assumed values 2 and 5, the highest value computer C received from child group C was 9.

The above hierarchical clocks are preferably implemented to allow for the comparison of two versions (which are potentially remote to each other) without necessarily needing to exchange messages to distant computers with high network latencies. It is assumed that the network distance between two computers at the top of the hierarchy is some orders of magnitude higher than between those lower down. The other aspect of this is that (assuming optimal geographical distribution) the closest member of the root group is orders of magnitude quicker to reach than the others. Therefore, if the information used to decide whether a certain version is "at or before" another version can be gathered without having to move very far, the operation becomes a lot quicker.

Figure 2:
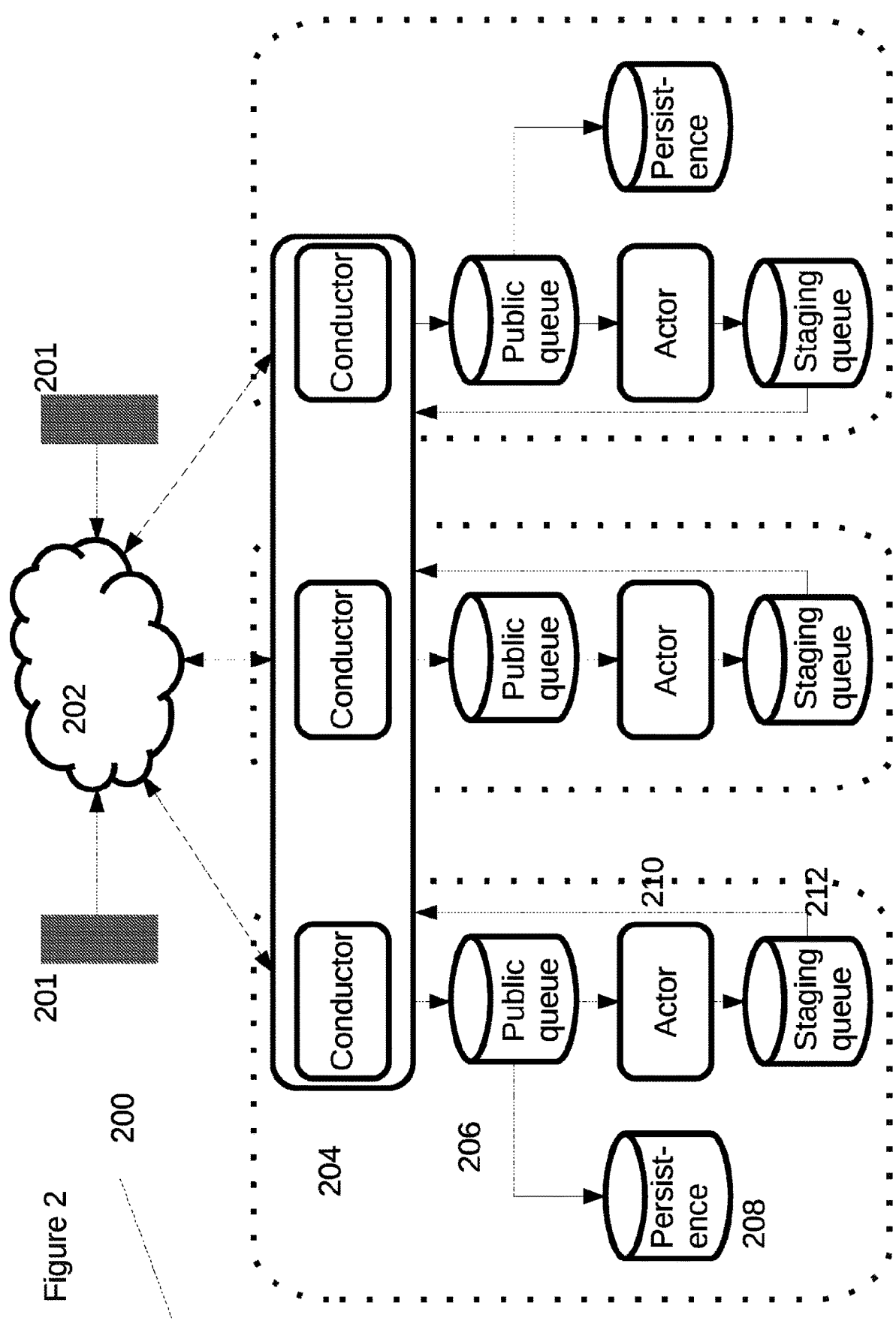
FIG. 2 relates to another exemplary, illustrative, non-limiting system for a distributed database according to at least some embodiments of the present invention.

FIG. 2 relates to another exemplary, illustrative, non-limiting system for a distributed database according to at least some embodiments of the present invention. As shown, a system 200 features a cloud connection 202, to which clients 201 of the datastore may connect. The data store can be described as a single "computer" in the system which can manage some state, distributed across 3 different data centers.

Cloud connection 202 also connects to a plurality of conductors 204. Each conductor 204 in turn connects to a public queue 206, which connects to a persistence node 208. Public queue 206 also connects to an actor 210 which connects to a staging queue 212. Staging queue 212 then reports back to conductor 204. Actor 210 is an actor node which participate in maintaining the internal state of the database and executing the operations upon it (i. e., the nodes mentioned previously, which are the servers and computers of the various groups for the data store).

Conductor nodes, shown as conductors 204, manage the forwarding of messages between a client 201 to target actor nodes. They reside on the target actor node's computer. Persistence nodes (208) provide durable backups of the system states.

Messages between nodes are passed through message-channels, described herein as queues. Staging queues 212, into which actor nodes publish, and from which conductor nodes consume messages, reside on the same computer as the node which was the source of the message. Public queues 206, into which conductor nodes publish, and from which actor nodes consume messages, reside on the consuming actor nodes' computers.

These queues can be replicated and distributed in any way the implementation sees fit. There are currently a number of available solutions to this, such as various messaging providers, such as for example Kafka or JMS.

Clients 201 send requests to the system through the internet. They are received at the data center they choose to connect to. Each data center is represented by rounded boxes with dotted lines. The requests are received by the conductor nodes. The conductor nodes 204 are represented as a single box spanning all 3 data centers. This represents that it's a single logical unit, which is synchronously distributed across all its instances in this example.

A message received from the clients 201 by any of the conductor node instances 204 is synchronized with them before they are published to the public queue 206. The actor nodes 210 consume from the public queue 206. After processing the incoming message, the actor nodes 210 publish its resulting messages into their own staging queues 212, from which the conductor nodes 204 consume messages, thus closing the loop.

Responses to client requests are also sent to the conductor nodes 204, which send responses to the clients 201.

Persistence nodes 208 also consume the same messages from the public queues 206 as actor nodes 210 do, but they don't publish anything. They create durable backups of the internal state of the database, instead of the event-streams utilized everywhere else.

A separate instance exists for each staging queue for each actor node instance. The nodes can be distributed according to the specific needs of the concerned actor- and staging nodes.

The purpose of the conductor nodes is to forward messages from the staging-queues to the public-queues (when their configured conditions for forwarding have been fulfilled) and at the same time provide error-correction guarantees.

For example, a conductor node might be configured to designate a replica of an actor node to be marked as unavailable if it didn't receive the expected answer from it within the allocated time. Once it becomes available again and has caught up with all the messages in the queue, this marker can be removed and normal operation can resume.

Conductor nodes can provide a failover mechanism by forwarding the messages from the staging queues to a specific public queue once a set number of the same message has been received (minimum-message number) on its configured staging queues (see the section Network Splits for additional rules). Since each executing process will publish exactly one copy of each message, minimum-message number has to be lower than or equal to the number of replicas for the targeted node (replication-factor). This way, even if "replication-factor—minimum-message number" nodes are lost in the system, it's still fully functional.

Conductor nodes can also be configured to have a set maximum idle time so that if at least one copy of the message is received to the configured staging queue, it can still forward it to the public queue if no other nodes have responded within the allocated time (e.g., if a VM garbage collector pause or a spike in network latency occurs).

The above implies that replicas of the public-queues must be maintained synchronously, since if they were maintained in a write-behind fashion and the nodes which are ahead were lost, some messages would not be fulfilled in the system.

Conductor nodes can have multiple instances running on multiple machines for redundancy. In this case, the framework must make sure that a message will not be processed twice by the actor node. This (for example) can be done using a "publish only if not present" mechanism, which must be atomic for the distributed queue, or by the actor nodes ignoring the message after its first occurrence in the queue.

Conductor-nodes provide error-correction mechanisms by comparing the messages published by all the other nodes to each other. According to the Gigabit Ethernet network standard IEEE 802.3ab, the maximum acceptable Bit Error Rate is 1 in 1010 bits. It has been estimated that somewhere between 1 in 16*106 to 1 in 109 TCP packets can be corrupted without a CRC catching the error (https:// dl.acm.org/citation.cfm?id=347561&dl=GUIDE=coll=GUIDE).

An error like that could be problematic for a system such as this, so an additional layer can be useful. Provided that the nodes are expected to have a uniform distribution for the bits which can potentially be corrupted in transition from one node to the queue and the distribution of error bits on any two nodes are independent, the chances of three messages having the same error, (even when considering the lower numbers, i.e.: higher chances) would be 1 packet in (16*106)3, which means that it would take roughly 130 million years for the system running a million packets each second for one bit of error to happen. This is compared to the current state of the art, which is 16*106, which would be about 16 seconds.

The system's backup mechanism works through persistence nodes. Their purpose is to consume the same input messages as all the other nodes in a write-behind approach which does not block any of the other nodes from executing and to save the resulting internal states. The persistence node can consume messages at its own time, since if the computer running it or the surrounding infrastructure does go down, it can still pick up where it stopped by fetching the next index from the distributed queue. Another requirement for the persistence nodes is that the write of the state to its local disk is transactional, so that if it reports that all messages have been consumed up to an index. This must be true even after a system failure. The persistence node is allowed to fetch messages again. This is useful if it was stopped from reaching a consistent state for some reason. This way it does not have to reach a consistent, persisted state after processing each message.

There is no limit to the number of persistence nodes the system can maintain, so these can also act as local copies of subsets of the whole system.

Any two computers exchanging network packets over some physical medium suffer from some level of network latency. This is an often-discussed problem of distributed systems and no clean solution has been proposed to this issue.

Due to the requirement that replicas of public queues must be kept synchronously, and because each operation must wait for all its messages to be answered when an answer is expected, at first glance, the system seems to have as many "single point of failures" as there are public queues in it.

There are, however mitigating strategies. Since nodes can have multiple synchronous replicas in different geographical locations (and are therefore very unlikely to suffer the same latency spikes as the other members of the cluster), and since modern queue-management systems like Kafka can alleviate latency problems by choosing a "leader" to define the correct state of the queue based on the availability of queue-replicas, latency problems can be isolated when they arise.

Let us define the "minimum-message number" property of a given actor node as the number N.

If one disregards local processing times, and consider that the conductor nodes are executing on the same computers as the public queues, any message's latency in the system will be equal to the highest value of the lowest N network latencies between the staging and the public queues.

Say that there are 5 replicas for a public queue, where the median latency is 5 milliseconds for each replica. Of these 5 replicas 3 are synchronous, the rest are write-behind. If one of the replicas is isolated from the others due to a network outage, the node can still work as expected and the 5 ms latency will still hold, as the missing replica will be ignored until it rejoins the cluster. In these cases the normally synchronous replica can be considered to be reclassified to a write-behind status, as it can only rejoin the other two once it has caught up with all the messages that were published since it was isolated from the others.

For write-behind, asynchronous replicas, the only requirement is that all their input-queues must have an eventual consensus about The messages and their contents in the queue and Their ordering.

Eventual consensus here means that not all queues have to receive all the messages at the same time, but if they have, the messages and their order must all match until that point and the missing message will eventually have to be delivered before the one after it is accepted.

Network Splits

A subclass of the latency problem is the network split. If the system were to naively serve clients during a network outage between two data centers replicating the same nodes, it could end up in a situation where it allowed mutating its local states which can conflict with the local state mutated by other computers on the other side of the network split.

Because of this, nodes must only be able to serve requests if they can communicate with the plurality of its own public queue's synchronous replicas. Luckily, there's already a mechanism to deal with this rule, the conductor node's settings. If there are no incoming messages to the public queue of the node, it won't process any operations, and will therefore be idle. So, conductor node's settings must disallow publishing messages to the public queue, unless it can see more than half of all synchronous replicas of it. This way, if a node fails to send a message to another node, it will be notified about the network outage affecting a particular region of the system and will therefore stop serving requests.

Figure 3:
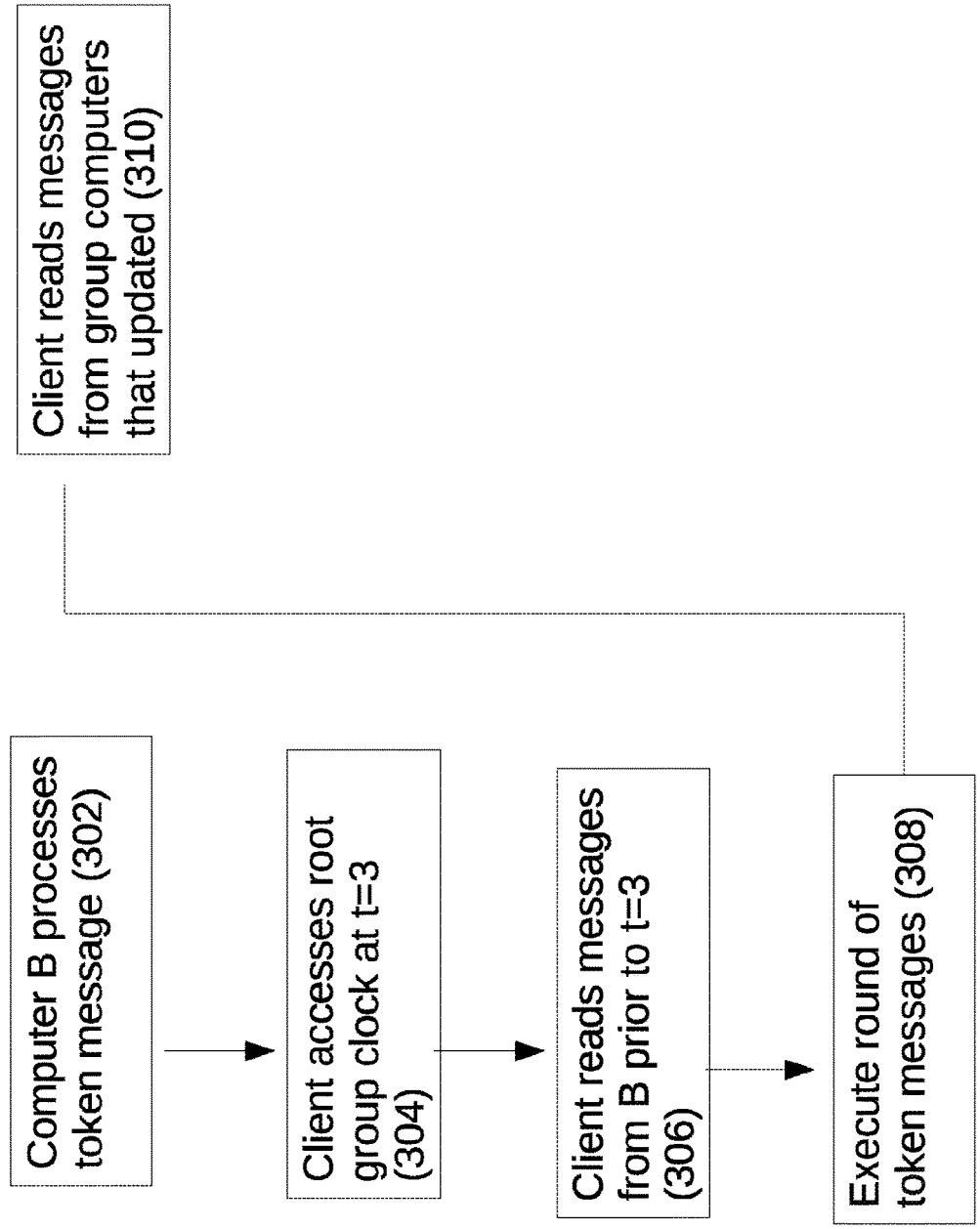
FIG. 3 relates to an exemplary, illustrative, non-limiting flow for a round of token messages according to at least some embodiments of the present invention.

FIG. 3 relates to an exemplary, illustrative, non-limiting flow for a round of token messages according to at least some embodiments of the present invention, also described with regard to FIGS. 1A and 1B above. As shown in a flow 300, computer B processes a token message at 302 as described above. At 304, a database client (operated by a user computational device as previously described) accesses the root group clock at t=3. For this flow, the client is assumed to be using the root group clock to determine timing for read/write messages. At 306, the client reads messages from computer B prior to t=3. Next a round of passing token messages is performed at 308, in which computers in the group are updated. Now the client reads messages from group computers that updated in 310.

Figure 4:
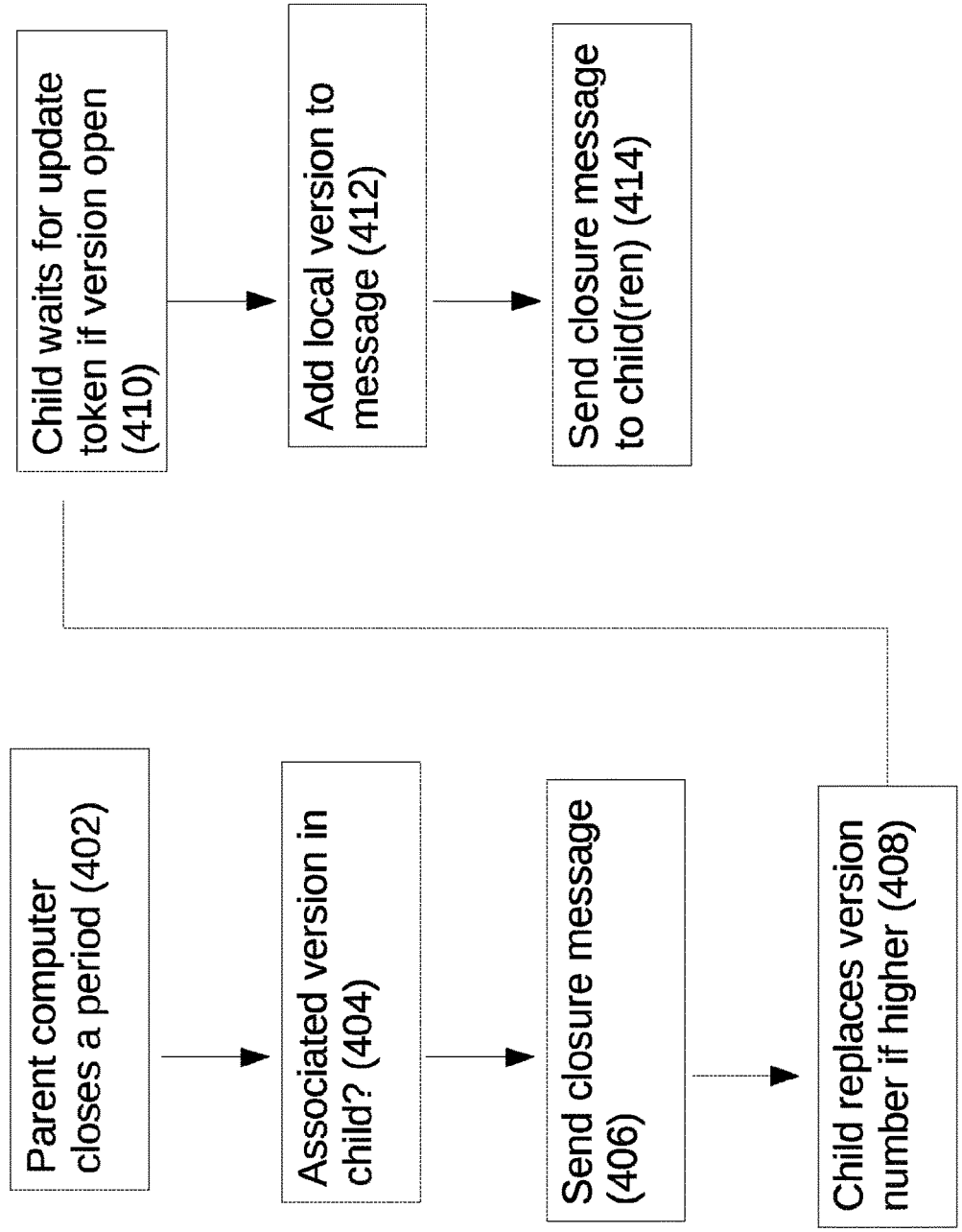
FIG. 4 relates to an exemplary, illustrative, non-limiting flow for a closure process according to at least some embodiments of the present invention.

FIG. 4 relates to an exemplary, illustrative, non-limiting flow for a closure process according to at least some embodiments of the present invention, in particular for the problem of transitive closure. This problem may be described as follows. Since querying the clock hierarchy for open periods is allowed and since open periods are closed independently from each other in each group, it is possible that a parent's closed period is associated with open periods in its child group. So, even if the parent closed its period and even though this version no longer accepts new associated versions from its children, there is no guarantee that its children will not accept transitively associated versions from their own children. This is possible for an open version on the child group which was already associated with a version on the parent.

This guarantee would only hold if, by the time the parent clock's period was closed, the periods the child sent earlier were also guaranteed to have been closed. Ensuring this would mean that the parent clock has to wait before closing its currently open period until it receives a signal for at least the highest period from the child computer associated with it. This is not only complicated, but would also slow down the closing process, which would affect the throughput of the whole system.

There are two versions, x and y on two computers. If, on the lowest common group the associated version are x' and y' respectively, x and y are considered to be transitively closed if all the versions in the x→x' association chain and all the versions in the y→y' association chain are closed.

One can use this information to know that each version that is associated (directly or transitively) with the specified versions in all the groups between the two versions have already been closed and so cannot include more information than what it already has. This does not guarantee that all versions transitively associated with these versions have also been closed.

Each computer holds an association list of all its ancestor computers and its highest version known by it to have been transitively closed. This associated list is called the list of known transitive closures.

Transitive closure messages are communicated from top to bottom. The message contains the list of versions and their originating computers (which is a chain of transitively associated versions). The first element of the list is the highest, triggering computer. The versions in the chain are added to the end of the list once they were also found to be closed.

Turning now to FIG. 4, as shown in a flow 400, a parent computer closes a period in 402. Each time a parent computer closes a period, it checks if that version was associated with another one on its child group in 404. If it was, it lists the associated versions for each computer in the child group and sends a transitive closure message to each in 406, containing the version it just closed as the first element of the list.

When a child computer processes the message in 408, it replaces the highest transitively closed version information for the ancestors listed in the message in its known transitive closures list if the newly received version information is a higher number than the previous one stored for the ancestor. Next, if the local version associated with the parent's version is still open, it waits for the next token-message to arrive in 410. Once the next token message has arrived, the child computer adds the local version associated with the parent's version to the end of the transitive close message in 412.

The child computer then lists the associated child periods for this version for each computer in its child group and sends the transitive closure message to each in 414, or terminates if it is not a parent computer.

This way, each computer has a list of which versions are stable for their ancestor computers, i.e., the highest known version to which no new values will be associated (either directly or transitively) on its ancestors.

Figure 5:
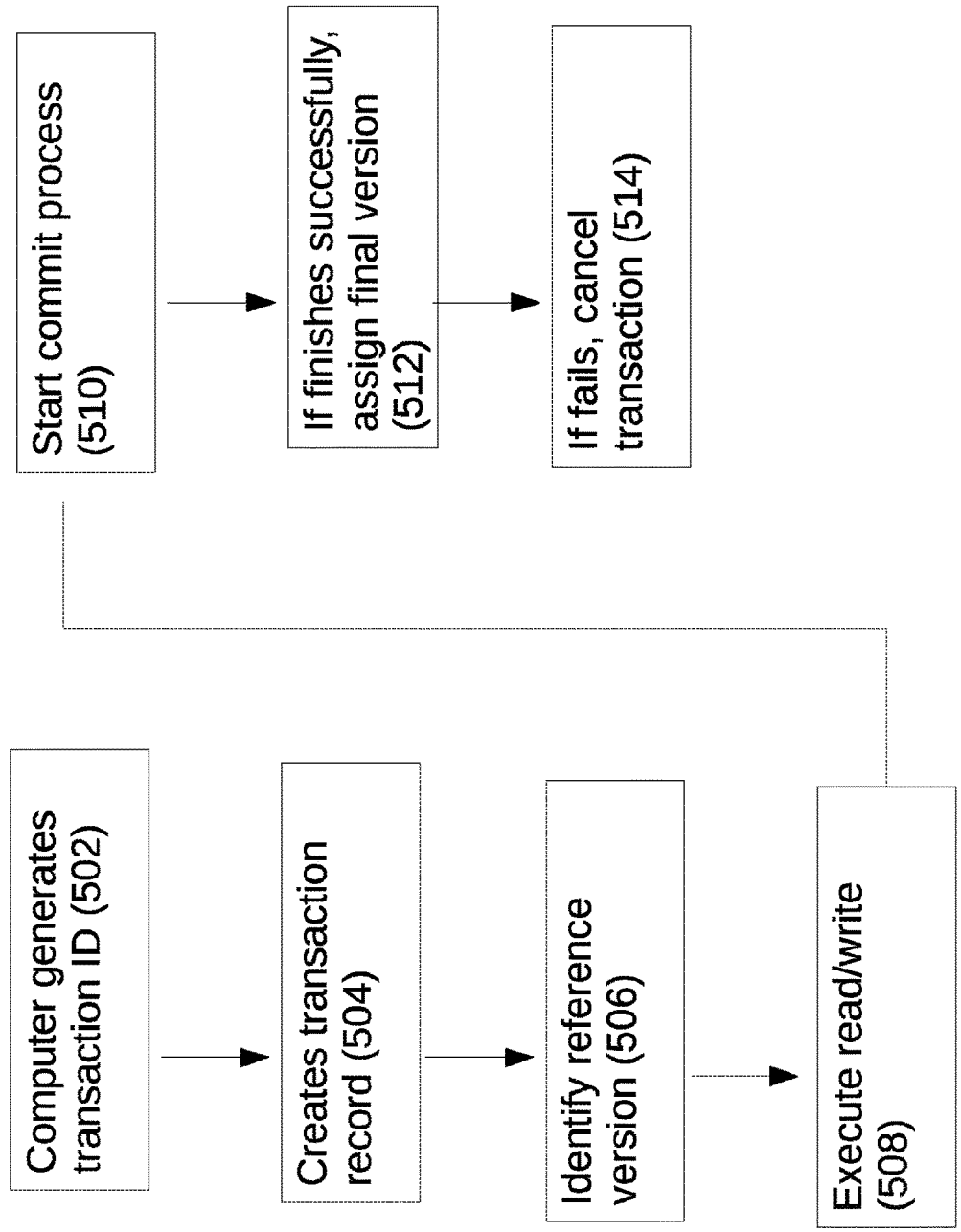
FIG. 5 relates to an exemplary, illustrative, non-limiting flow for a read/write process according to at least some embodiments of the present invention.

FIG. 5 relates to an exemplary, illustrative, non-limiting flow for a read/write process according to at least some embodiments of the present invention, which relates to transactionality. Deletes, modifications and creation of records can be thought of as incremental new information within the system. When defined this way, the whole state of the system can be described by a constantly growing set of information, where new information is based on earlier ones. If a version is assigned to these bits of information, one can tell the ordering of any two pieces of information (for details, see Weak and strong ordering).

If the system is to be consistent, the observer must be able to deterministically tell whether a piece of information is a part of the whole system for each finalized version, and no previously entered information can be lost.

The system stores information, upon which read/write operations are executed. These processes and the modifications created by them are called transactions. Transactions can be cancelled, in which case the transaction won't affect the information (i.e., the information readable by clients) in the system. Thus, the transaction defines both a set of information and the read/write process. Transactions are always associated with (and managed by) a single computer. Records are atomic pieces of information which are viewable by the client. A new version of a record (created by a transaction updating it) is called a variant. Based on the above, when serving a client request, at most one variant for a record can be chosen at any time.

The system preferably supports the atomic finalization or cancellation of variants created by a single transaction. This means that no proper subset of information written by a transaction can be read by another transaction. Since the client can use any closed period to query the system and since information is distributed across multiple computers, some form of synchronization is needed to achieve this. Current database servers solve this problem by blocking the execution of all but one of a set of conflicting transactions until a decision is made whether the executing transaction is committed or cancelled. This solution involves blocking transactions, so this is not an acceptable strategy here.

If an operation modifies an existing record, the system guarantees that the variant it introduces will be the next one compared to the record it read during its read-phase (this implies that records have to be read by the process before they can be modified) or that the whole transaction will be cancelled.

The reference version is a specific version chosen for the statement, to which all encountered variants' versions will be compared. A read operation will only include a variant in its results if the variant's version is at or before the reference version.

Turning now to FIG. 5, the transaction process 500 preferably starts with 502, in which the computer associated with the transaction generates a transaction identifier, which also identifies the associated computer. In 504, the computer creates a transaction record on the computer associated with the transaction. In 506, the computer identifies the reference version to use for its read operations which depends on the isolation level. In 508, the computer executes the read/write operations. In 510, the computer starts the commit process, which will be detailed in an optional implementation below. In 512, if the commit process finishes successfully, the transaction is assigned a final version, which will also become the final version of each piece of information it created. In 514, if the commit process fails, the transaction is cancelled, and it has no effect on the information in the system.

Figure 6:
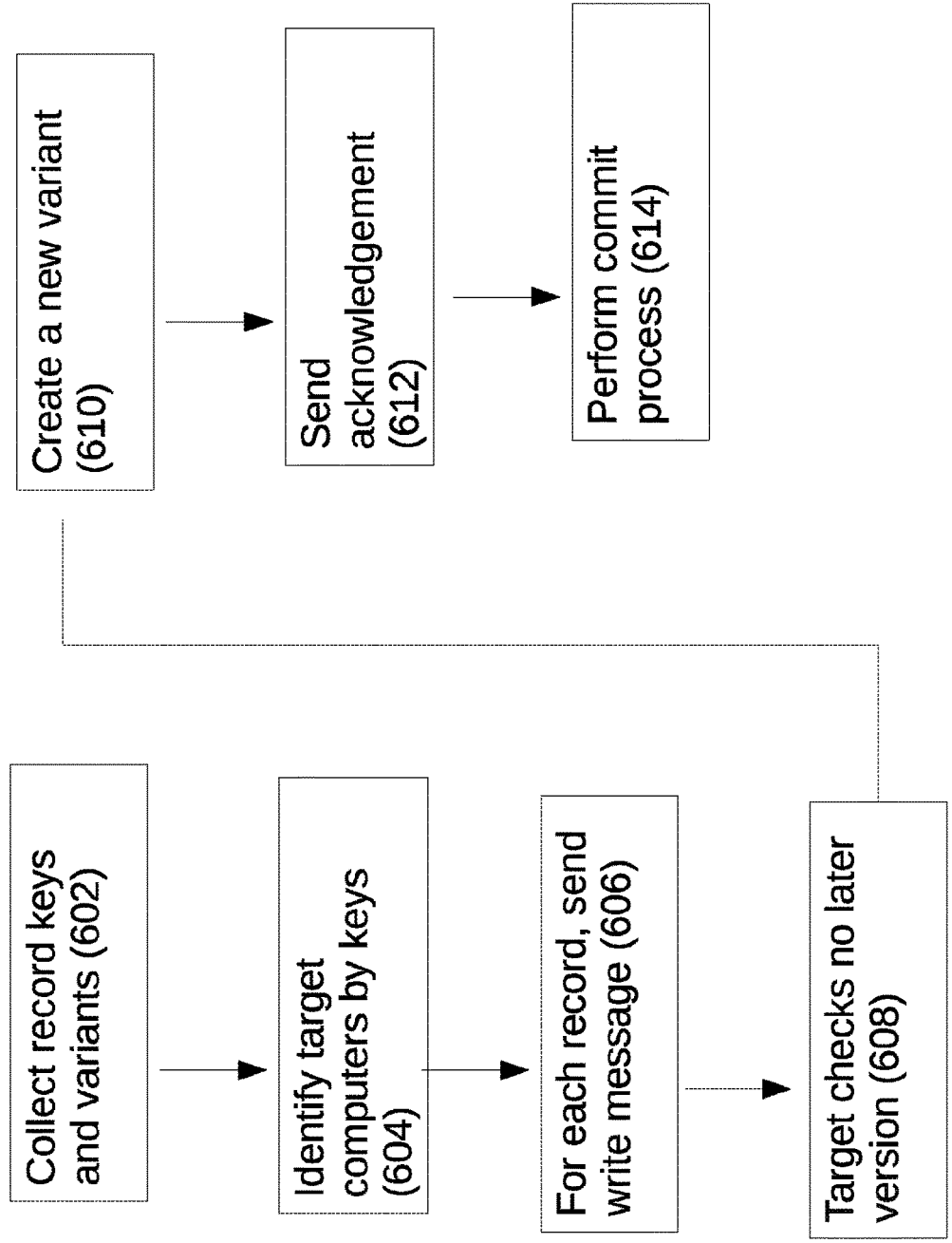
FIG. 6 relates to an exemplary, illustrative, non-limiting flow for creating a variant according to at least some embodiments of the present invention.

FIG. 6 relates to an exemplary, illustrative, non-limiting flow for a write process according to at least some embodiments of the present invention. While the transaction is executing its processes (and so can read or write data on multiple computers) it does not have a final version. Therefore, variants created by it (potentially on other computers) cannot have a version either.

Until the final version is assigned to it, the transaction uses its globally unique transaction identifier in place of a version.

A transaction executes the following steps when updating or creating a set of records, as shown in a flow 600. In 602, the transaction collects the variants and keys of the records it will need to update by executing the read operation (skipped if it is a new record, not a modification). In 604, based on the key of each record, it identifies which computers hold them (the target computers). In 606, for each record, it sends a write message to the target computer, which contains:

1. the new value of the record,
2. the transaction identifier,
3. if this is a modification: the record's version read earlier.

The target computers process the message (in an atomic operation). In 608, if this is a modification: the transaction checks if the variant already has a finalized version that is later than the version read in 602. If it does, then the whole transaction is cancelled.

Otherwise, in 610, the transaction creates a new variant which holds the transaction identifier as a temporary (non-finalized) version.

In 612, the target computers send an acknowledgement for each write operation.

For this non-limiting example, it is assumed that variants created by finalized transactions never overlap. In other words: 606 on the computer managing the record is the atomic event from which point onward no two parallel transactions can be committed which have both inserted variants for the same record.

If a transaction updates the same record multiple times, the same variant will be updated with the new values of the record, but the original read version of the variant will not be changed. This is safe to do, because (even if the implementing database chooses a relaxed isolation strategy and allows for an earlier version in a later read statement than the one it used before) a transaction will always find its own changes of a record first.

The commit process is performed in 614. After the commit process finishes successfully, the finalized version is written into the transaction's record. The assignment of the final version to the transaction is the atomic event of the transaction's commit. The final version will be the open version of the group clock on the computer associated with the transaction.

Figure 7:
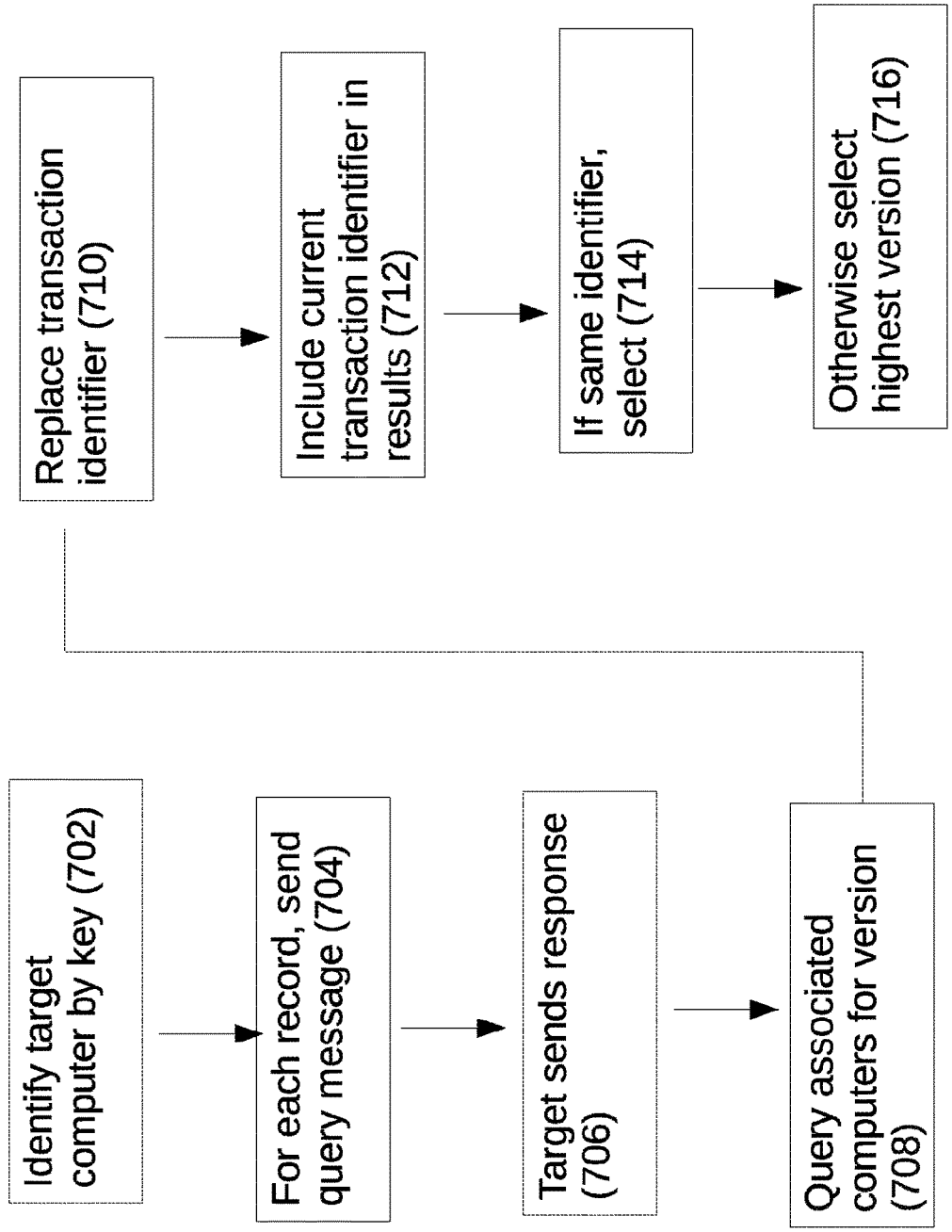
FIG. 7 relates to an exemplary, illustrative, non-limiting flow for selecting a correct version according to at least some embodiments of the present invention.

FIG. 7 relates to an exemplary, illustrative, non-limiting flow for selecting a correct version according to at least some embodiments of the present invention for a read process. To be able to serve read requests in a non-blocking fashion, the following is proposed:

1. The read process first compiles the necessary data from the computers holding the required keys.
2. It computes the reference version according to the isolation level used by the read process.
3. Before applying the data transformations required by the client, it filters out variants which are "after" the calculated version (see at or before relation).
4. For each record, the variant with the highest version is chosen.

Thus, since variants (which are part of a single transaction) are entered into the system atomically, they will either all be a part of the results, or will all be filtered.

Variants introduced by a transaction will be observable by another read process if the version of the transaction and the reference version of the read process are transitively closed.

An aim of the system is to provide Oracle- and Postgres-like "statement-level repeatable read" isolation-level for each execution. To this end, a single reference version is identified for each read process.

Since the transaction is assigned a version in an atomic event, it is possible that the variant found by the read process will not yet hold the transaction's final version when the query finds it, even though this assignment might have already happened on the remote computer managing the transaction. In these cases, (when the read process encounters a variant with a transaction id during its execution) it has to query the computer managing that transaction about the current state of the transaction. If the transaction has been finalized in the meantime, the variant will be included in the results. In any other case, the variant will be filtered out, either if it has no version or if the version was found to be later than the reference version, unless its transaction-identifier is that of the read process.

This is safe to do from a consistency perspective, since no variant which was created after the read operation's message has reached the target computers can be included in the results. This is due to the fact that only transitively closed values can be chosen as reference versions. Since all versions at or before (and hence, the set of values associated with) a transitively closed version on a computer are guaranteed to also be closed on the queried computers, these immutable sets must be consistent. Because of the transitive closure, it guarantees that no information is in flux between different computers. All of the periods have been closed between two computers.

When reading a record, a transaction takes the following steps in a process 700. At 702, based on the key of the record, it identifies which computer holds the record; this is the target computer. At 704, it sends a query message to the target computer containing the reference version and the key of the record. At 706, the target computer sends a response consisting of:

1. all the variants of the record, and
2. the list of its known transitively closed group clock values.

At 708, once the response is received on the transaction's computer, if transaction identifiers were found, computers associated with these transactions are queried for their versions. At 710, the received versions replace the transaction identifiers on variants, which were created by the transactions. At 712, the variants marked with a transaction identifier equal to the executing transaction's own transaction identifier are also added to the results. Those variants which have no finalized version are preferably filtered out.

The reference version is calculated according to the isolation level and the remaining variants using the algorithm described below.

The chosen variant in 714 is:

1. The one with the same transaction identifier as the transaction running the statement, or if that does not exist,
2. The one with the highest version using the strong ordering strategy.

The results are returned to the client after formatted according to the statement's requirements in 716.

Figure 8:
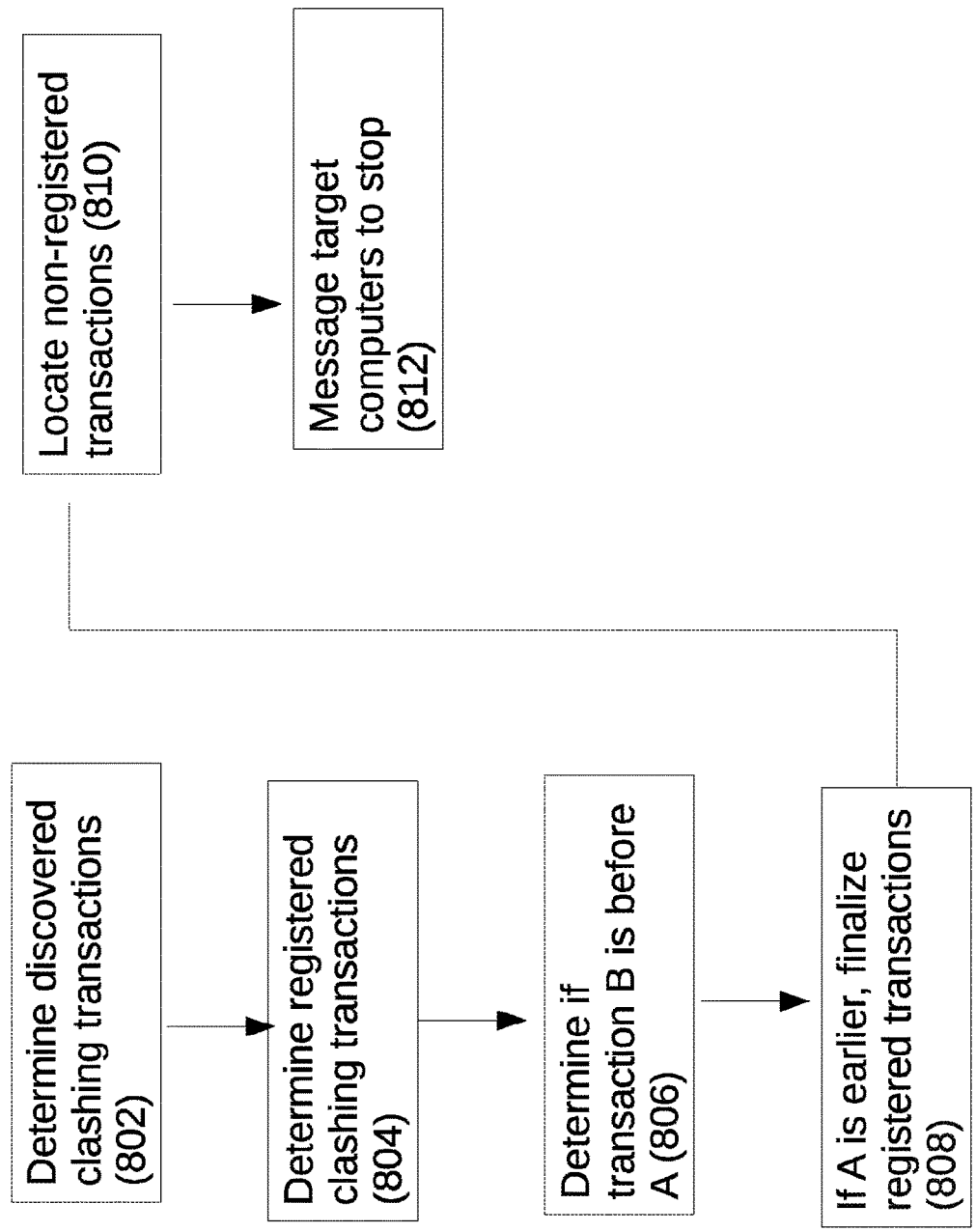
FIG. 8 relates to an exemplary, illustrative, non-limiting flow for handling clashing transactions according to at least some embodiments of the present invention.

FIG. 8 relates to an exemplary, illustrative, non-limiting flow for handling clashing transactions according to at least some embodiments of the present invention. Because the set of variants left by a single transaction can only be finalized atomically, the event of the finalization of these variants is the same event as the finalization of the transaction itself and vice versa.

Each variant holds:
The version of the variant that was modified
The finalized version of the transaction
The new value of the record.

Since the version of the transaction is either missing or (if finalized) necessarily later than the version of the variant which was modified by it, a period between these two versions can be identified. One can call this the contended time window. The purpose of the flow for FIG. 8 is to guarantee that there can never be two finalized variants for the same record with overlapping contended time windows.

In other words, the observer must always be able to tell what the state of a record was at any given time. In a distributed environment, this is not only an important but also a difficult question, since different computers can each have different pieces of information. The classic solution to this problem is to make overlapping write processes wait for each other's termination, so that if both transactions are trying to modify the same record, only one of them can progress, and the other one will have to wait until the first one has finished all its operations.

Since transactions cannot wait for each other in this system (this is a requirement of linear scalability), a different solution is needed.

Variants in the system always have a guaranteed order between them (i.e., they cannot be equal to each other, or they would have been written by overlapping transactions).

In the next examples there are two transactions: A and B, which are both modifying information X held on computer 0. The information of the transactions is held on computers 0A and 0B, respectively. The variant for X written by A is called XA, the one written by B is referred to as XB.

Each transaction leaves a mark of its transaction identifier on the variant created by it, as explained in the Write process chapter. If transaction B's write operation creating XB came after the creation of XA, one can say that B is known to be clashing with A on X, since transaction B can (during its execution of the write operation) see A's transaction identifier on the variant XA. This is not necessarily a symmetric relationship. For it to be so, both transactions would need to know about the variant left by the other one. To achieve this, A would need to look at X at a later stage again, after XB had been created. Therefore, this relationship can be symmetric, but it is not guaranteed to be.

As explained previously, a read process can only read the variants either created by its own transaction or those with a finalized version at or before the reference version of the read process. Here, the discussion is simplified so that a process can only read variants which were already finalized when the read process started.

Continuing the example, if B is known to be clashing with A, this also means that B has information that both A and B cannot be committed. So B will only get an opportunity to be committed, if A is cancelled. The situation is different from A's point of view: since it arrived at X before B's write operation did, it does not have this information. In other words, A does not know that it conflicts with B.

Thus, there is asymmetrical information between the transactions, which affects their end-state calculations. However, the dependency itself is mutual. So, if A is committed by the system, then B has to be cancelled and vice versa. As mentioned earlier, the commit processes can also be run on different computers at the same time and they are not allowed to block each other from finishing.

The solution is an algorithm that guarantees that (based on the information available to them) each transaction can calculate what the final state is for overlapping transactions. In other words, which ones were committed and which ones were cancelled in the system.

If the final state of a transaction (the information whether it was committed or cancelled) is purely a function of its dependencies on other transactions held in the system (and their state), the final state itself is only a redundancy, which can be reliably calculated again by looking up the necessary information.

So, the goal is an algorithm which guarantees that:

1. Two clashing (conflicting, overlapping) transactions will never both be committed.

2. Each running transaction will reach the same conclusion about the final state of each overlapping transaction.

3. The algorithm can run in parallel on multiple computers with potentially high latencies between them and each one will reach the same conclusion about the end state of each transaction it needs to know about.

Turning now to FIG. 8, in a process 800, the set of transactions which the transaction knows to be clashing with (as it has seen their variants during its execution) is determined in 802. Next in 804, the set of transactions which have seen at least one variant created by the transaction for a record they also modified, and have notified the transaction about this at the start of their own commit process, before the transaction's commit process was started, is determined.

Let us call the first set the discovered clashing transactions (or discovered for short), and the second set the registered clashing transactions (or registered for short). The elements in either set will be called the detected transactions. Both sets already exist when a transaction's commit process is started.

Every transaction's intent to commit either has to be registered on the record of the other transaction, or (failing that) calculate what the end state of the other transactions are. In other words: whether a transaction A can register its intent to commit on transaction B is the same as asking the questions:

1. Will A be finalized and force B to be cancelled?
2. Will B be finalized and force A to be cancelled?
3. Will both of them be cancelled?

The goal of the flow is that at any time a transaction reads the data of another transaction, it can make an unequivocal decision.

When transactions are committed, they need to notify the discovered transactions about this and must stop them from being committed before those transactions can stop it.

When transaction B has finished writing all its variants and collected all the information about the transactions it clashes with (call this transaction A), the client can ask the system to commit its changes. One can look at the transactions known to be clashing with this transaction in two ways:

B must stop A from committing or if A's commit process has already started, B must find out what A's final state is and determine its own final state based on this information.

This process is performed in 806, to determine whether A is before B.

So, if transaction A's commit process was started earlier on 0A and B discovered A, then it inspects and finalizes the registered set on 0B in 808. After this, the registered set is immutable. Transaction A then finds the transactions in 810 which were:

1. not in its registered set
2. but are present in its discovered set

Transaction A then sends a message to the computers managing these transactions in 812, notifying them that B is clashing with them and that its commit process was started. In our example, this is A managed by 0A.

After this atomic step, B does not accept any more transactions which could stop it from committing. Therefore, transactions which clash with B on any record and arrive later, are blocked by B, so that they can only commit if B is cancelled.

Using the above, the potential circles are eliminated from the analysis, as the essence of such a loop is that an event in a set affects (directly or indirectly) an element which was already present in it. This is impossible, since as soon as the commit process is started, a transaction record's state is no longer mutable.

Since the discovered set is final (as the transaction's execution has finished) and the registered set is no longer mutable after this event either, any state that could influence the decision on A's end-state is immutable as far as the transaction record present is concerned.

So, if (when the commit process is started) A finds that B is listed in its registered set, the following is known:
1. B's commit process started before A's.
2. B's registered set is no longer mutable.

So it is known already whether B is an obstacle to A committing or vice versa.

If B is not in A's registered set, A will assume that B has not started yet, so B's end-state doesn't have to be calculated by A when its commit process decides whether it can be committed. In this case the transactions which have to be inspected are the ones which are in the registered set at the time of finalization.

A transaction will be committed if and only if:
either its registered set is empty,
or every transaction in its registered set has been cancelled.

If one assumes that every transaction's state can be explored in the system (and since there can be no circles in the registered sets), it can be shown that an end state can be reliably calculated for each transaction.

This would be a sufficient solution if each commit ran in a global order. However, since multiple computers participate in the system, commit processes can start in parallel and they can finalize their registered sets simultaneously. Therefore, it is possible that transaction B discovered by A is not yet present in its registered set, but by the time the message (notifying B) arrived, it already started its own commit process and thus finalized its registered set. In this case A is cancelled. Since this relationship is asymmetrical (so B does not necessarily know about its overlap with A) it is possible, but not certain, that both transactions are cancelled.

If transaction A has successfully registered itself in the registered set of each of its discovered transactions, one can say the finalization process had a successful start. Conversely, if A encounters at least one finalized registered set while trying to register itself, one can say that it had a failed start.

A successful start is a necessary but not sufficient condition for a transaction's successful commit.

To decide whether a transaction had a successful start, it is necessary to:
Receive each message on the computer holding the record of the discovered transaction,
For the message to be processed,
The resulting message to be sent,
For the original computer to process the resulting messages.

Thus, the information is not available at the start of the commit process. This process of sending out the messages and waiting for their results is called the start state aggregation. The start state aggregation process is considered closed when either the first unsuccessful registration message was processed or when all registration messages have been processed successfully.

Therefore, a transaction A can be considered to have committed if and only if:
1. its registered set is empty or each transaction in it was found to have been cancelled; and
2. for each transaction B which is not present in A's registered set, but is present in its discovered set, transaction A is present in B's registered set (in other words, if A managed to register itself into each discovered transaction's registered set in time).

It is considered to be cancelled otherwise.

In order to get rid of information which can no longer be of use in the system, it needs to reach a global consensus on what versions are still in use. The result of this consensus is that anything before this version can either be removed (if it was technical information used for the commit process for example) or made permanent (if there were multiple versions for a record for example) for information where versions no longer matter (as it is now visible to all present and future read processes). Since each computer executing a process must participate in this consensus, its value must eventually be communicated as a value of the clock of the root node-group, as this is the only ancestor-group to everyone.

A possible solution to this is to implement a hierarchical message-passing sequence between the computers executing these processes. Each round-trip could yield the lowest version still in use within the specific group of computers, after which this version could be translated to the parent-computer's level by passing it upwards in the hierarchy. After the root-group completes its own message-passing round, the result is the lowest global version still in use by any of the currently executing processes.

This mechanism could manage timeouts, cancels and information left over from transaction commits, for example.

For performance reasons, it is suggested that transactions (which have been assigned a version) should update the information they inserted by converting their own version values to the clock of the computer holding it. Although no transitively associated value can exist between most computers, a local range can still be specified, which would say something like "version between X and Y" (where X<Y and are local values).

As an added measure it is also suggested to introduce a reserved version number, which is lower than any other version in the system. This is useful when a version of an information is known to be lower than the lowest version still used by the system. In these cases, the information's version would no longer serve any purpose but would still need to be considered when running queries.

Figure 9:
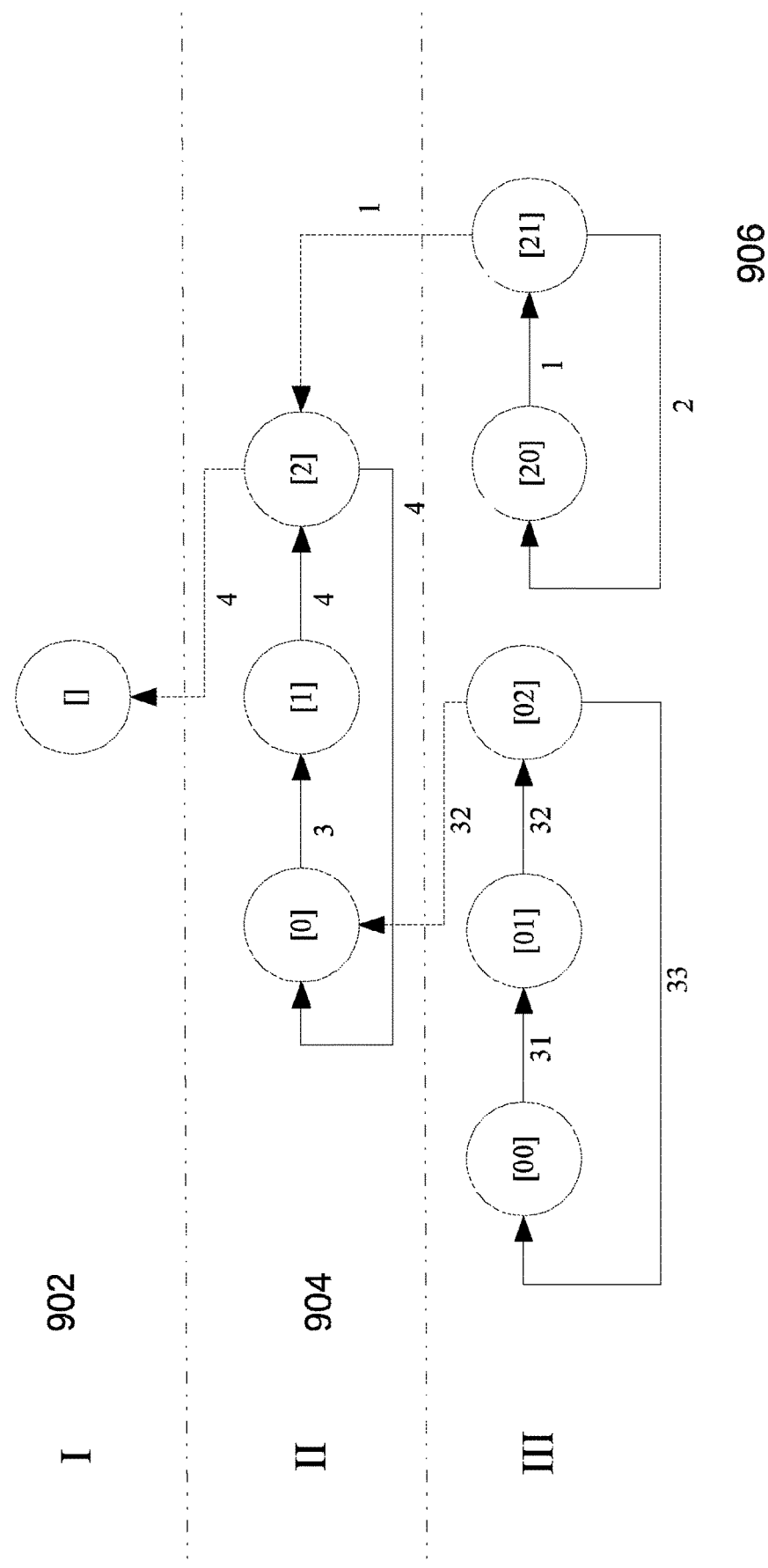
FIG. 9 relates to an exemplary, illustrative, non-limiting flow for a message process according to at least some embodiments of the present invention.

FIG. 9 relates to an exemplary, illustrative, non-limiting flow for a message process according to at least some embodiments of the present invention. In a flow 900, three layers of nodes (computational devices) that provide the data store are shown: a root 902 as layer one, which is the root computational device; a first layer of child nodes 904 as layer two; and a second layer of child nodes 906 as layer three. Each circle is a computational device.

On the left hand side, at child nodes 906, a message 32 is shown as being passed from node 01 to node 02. This message is then passed by node 02 up to the parent of node 02, which is node 0 of the first layer of child nodes 904, in order to update node 0.

On the right hand side, at child notes 906, a message 1 is passed from node 20 to node 21. Node 21 then updates node 2 of the next level in the hierarchy.

With regard to child nodes 904, a message 4 is passed from node 1 to node 2, which then updates the root 902 and also updates node 0.

Additional non-limiting aspects of the system and method of the present invention are described below.

Even though a technical detail, redundancy, latency- and failover-management are critical aspects of distributed systems. In the following, an optional embodiment is presented to configure the system so that it can recover from the simultaneous failure of multiple nodes, provide error-correction, persistence and a latency mitigation strategy.

The system communicates using asynchronous messages only. These messages are published to- and consumed from queues. There is no requirement for all messages in the system to provide a response for every message-type (i.e.: some message types require a response, some do not), and if it does, there's no requirement for the response to be sent immediately after the original message's processing has finished (although the spirit of the framework is that it should).

In this implementation, it is required that each node in the system must:
  Be able to list the versions used by its executing operations according to the requirements of the implementing system. No obvious solution can be suggested here to determine this version, since the way isolation-levels are implemented in a system or the way caching strategies are employed can influence what versions are still used here.
  Not rely on any state specific to the host-system (e.g.: computer's internal clock, IP- or MAC-address or any of the other local settings).
  Must only use deterministic code, like repeatable randomization using a known seed.
  Be able to provide the index of the last message it processed from its input-queue when requested.
  Have a set number of running replicas.
  Each queue in the system must:
  Have a repeatable order in which they store messages
  Be able to provide these messages again, in order, starting from an index chosen by the client API
  Be persistent, so that if the system suddenly loses power, the messages which have been accepted by the queue are not lost
  Be consistent, so that messages which have been accepted by the queue are still available even if any of the computers managing the node becomes unresponsive The above means that the human definition of time is replaced by one of message ordering and determinism. These requirements also mean that each state of each computer can be reconstructed by feeding them the ordered messages in the public queues.

According to at least some embodiments, the system preferably comprises a number of clocks ordered into a hierarchical tree structure, advancing independently from each other. On this structure, an algorithm exists which defines global timestamps. Any two timestamps can be compared to each other to decide which happened:
  1. Later,
  2. Earlier or
  3. At the same time.

The system preferably operates according to an algorithm which guarantees that each piece of information will be readable and can be evaluated using a certain timestamp and that information introduced later cannot be a part of the results.

At least one flow according to at least some embodiments provides a solution which guarantees that if there are conflicting modifications, there is a system-wide consensus regarding which modifications (if any) have been accepted and which were rejected. More formally: if version is defined to be the value of a piece of information at a given time, then each version can only have at most one successive version.

According to at least some embodiments, an implementing infrastructure enables:
  Fail-safe, redundant communication between computers in the distributed system,
  Error-correction,
  Persistence,
  Replication
  And latency mitigation.

According to at least some embodiments, the system as described herein allows for the implementation of an SQL-compatible database. Some non-limiting points of comparison are now made with SQL databases.

The SQL standard allows for:
  1. A transaction to be refused for any reason, at the discretion of the server;
  2. The database to escalate the defined isolation level without asking for permission from the client.

The system described herein, in at least some embodiments, guarantees that it follows the industry's ACID properties, which are:
  1. Transactions are introduced into the datastore atomically and the other transactions will also acquire any information introduced by it atomically.
  2. The redundant constraint-information introduced by a transaction will only become available at the same time as all the other information entered by the transaction and there can never be two simultaneous parallel transactions committed which would together violate the constraint. Thus, it is always possible for the system to evaluate the validity of a redundant constraint-record either at the time the information is introduced or at commit.
  3. Transactions cannot read or write each other's half-finished states.
  4. Information already accepted by the system cannot be lost at a later time.

As implied, this system does not solve the existing issues posed by the SQL-standard, such as phantom reads, phantom writes or the necessity of using SELECT FOR UPDATE statements for signaling write-protection of a set of information when that is needed.

The term statement means roughly the same in this document as it does in the SQL-standard, so a read and/or write instruction from the client, which might have resulted in some information being presented back to it.

The SQL standard defines the following read phenomena:
  Dirty Read: When a transaction is allowed to read data from a row that was modified by another transaction but not yet committed.
  Non-repeatable Read: When a record is selected twice during the execution of a transaction and its value changes between the two.
  Phantom Read: When a new record is inserted that fulfils the criteria of a repeated search and it was not present the first time, but it is present the second time.

Isolation levels are defined by whether these phenomena are allowed or disallowed from happening during the course of their execution. The following table connects the read phenomena to the isolation level definitions:

| Isolation Level | Dirty Read | Non-repeatable Read | Phantom Read |
|---|---|---|---|
| READ UNCOMMITTED | Allowed | Allowed | Allowed |
| READ COMMITTED | Disallowed | Allowed | Allowed |
| REPEATABLE READ | Disallowed | Disallowed | Allowed |
| SERIALIZABLE | Disallowed | Disallowed | Disallowed |

Isolation levels are allowed to be elevated, allowing escalation from the more lenient toward the stricter ones. For example, the system is allowed to serve READ COMMITTED transactions to the client if it requested a READ UNCOMMITTED one, but not the other way around.

Without wishing to be limited, the system of the present invention preferably allows the READ COMMITTED and the SERIALIZABLE isolation levels. This is due to the different architecture of the data store, which is designed to be non-blocking by nature.

Read uncommitted would allow clients to access data which has not yet been committed by other transactions. This would be impractical in the described framework and since the spirit of this isolation level is to allow the ability to provide non-blocking queries to the user and this is already fulfilled, the framework automatically escalates this level to READ COMMITTED.

If there is a guarantee that information which has been seen by a client can still be accessed later on (an assumption made in this proposal based on the durability requirement of ACID), the value which has been established as a reference value for a statement will have to be the minimum reference value for subsequent statements. Since moving up on the group clock hierarchy means that the period above it might be open, in some cases the subsequent statement may have to wait for a group clock to include the earlier reference value.

The computer executing the read process and the computers which serve information for the process are together called the participating computers.

Any reference version is fit for statements running on a READ COMMITTED isolation level, as long as it fulfils the following criteria:

1. The reference version must be at or before the version produced by the following algorithm:
  1. Take the lowest common group clock of the participating computers.
  2. Take lowest value stored in the lists of known transitive closures from the participating computers.
2. The reference version of each statement (which is non-first in a transaction) will either have to be equal to or be higher than the reference version of the previous statement. The reference version described this way is called the historical reference version and is stored on the database record. If the reference version identified by the strategy is lower than the historical reference version, the process has to wait until the identified computers receive notifications that the historical reference version (or a version associated with it) has been recursively locked for all of the participating computers. Once it has received this notification from each computer, it can retry executing the statement.

For an optimisation strategy on choosing which ancestor-version can be chosen, please see Comparing versions.

Since transitive closure takes some time (even after a transaction has received its final version), there is a trade-off between:

newer information being present in the results—in this case, there is a potential delay a client might have to suffer while executing a statement; and newer information missing from the results—in this case, the client does not have to wait for the statement to return with the results.

Below, two ends of the spectrum and a mid-way solution are presented.

1. In solution 1, the recently finalized variants will not be found by the statement, but it is only necessary to wait for a consistent state in very rare circumstances.

2. In solution 2, the statement may have to wait in certain cases, but it is guaranteed to find the latest possible state that is guaranteed to be consistent.

3. Solution 3 has a mix of both, to show a possible compromise between solutions 1 and 2.

Solution 1: Non-Waiting

The statement uses the versions which are at or before the lowest recursively closed version of the lowest common group clock of participating computers.

The data set for this reference version is guaranteed to be consistent without having to wait for anything, as long as the identified version is higher or equal to the historical reference version stored in the database record.

Solution 2: Up to Date

The statement identifies the last closed period on the computer processing the statement as its reference version. When the process identifies a computer that needs to be queried for information, it waits until the computer has received the recursively locked message for at least the lowest common group clock's associated value. The resulting reference version is the lowest common group clock's version which is associated with the version the statement identified at the start.

Solution 3: Middle Ground

The statement identifies the last closed period of the parent computer of the computer executing the statement, thus making sure that all the computers which belong to the same group as itself will have a consistent data set. If the statement needs to query computers outside its own group, it uses the method described in the "Up to date" strategy.

Which point on this spectrum is targeted by the implementing database should be determined by the use case of the database and it can be a configuration setting.

This strategy works for SELECT FOR UPDATE statements or conditional UPDATE statements also. In these cases, the statement has to do two passes:

On the first pass, it identifies the variants it will need to update, in the same way as if it was doing a SELECT.

On the second pass, it inserts its own variants by executing the write process.

Since modifications are considered to be additional variants in the system and not direct changes to the record, finalized variants are immutable. Since the write process will use the variants it identified in this step, the optimistic conflict resolution algorithm (described in chapter Transaction commit algorithm) will deal with any potential parallel modifications from this point on.

Once the reference version has been identified, it replaces the currently stored historical reference version with the new one.

Repeatable Read

The framework automatically escalates this level to SERIALIZABLE, since new variants are versioned using the same method as updated or deleted ones, and therefore it is not possible to make a distinction between the two.

Serializable

Clients look for information which has a lower or equal version to the last known transitively closed period of the root group clock, or if that is found not to be transitively closed on a participating computer, the lowest one of the transitively closed versions (based on the lowest common group clock) found on the participating computers.

It is possible that a version which is transitively closed on one computer is not closed on another one. In these cases, even choosing the lowest version in a common ancestor group will only guarantee that this fulfils the requirements for SERIALIZABLE for the statement, not the transaction, since there is no guarantee that the transitively closed information already reached all the computers which hold information for later statements in the same transaction. Theoretically, it is possible for a subsequent statement to choose an even lower version when applying the above rules. Technically, the only way to be sure that there can be no need to wait would be if the computer managing the transaction knew what versions are known to be transitively closed to all the other computers in the system.

This however, is a moot point. Realistically, the time it takes to send the transitive closure message (which must have already been sent for the previous one compared to the one chosen based on the rule above) is much shorter than the time it takes for a remote message to be received, so in these extreme cases waiting before answering the message should cause only an insignificant delay.

Using this version means that the referenced set of information will not change. This also means that there are more opportunities for transactions to conflict than on the READ COMMITTED level.

Since constraints and indices are redundancies of the original transaction's data set, they will all either be chosen to be the next version or will be rejected together. The SQL standard only requires these values to be correct after commit, so the SQL standard still holds even with the optimistic conflict resolution model, even if this introduces a change for developers when working with the database, compared to current database models.

The SQL standard specifies the following constraints. In the following paragraphs, according to at least some embodiments, there is provided a possible strategy to implement them in the described system. Note that these are only examples and implementing databases can choose to provide these guarantees in any way they see fit.

Not Null, Check, Default

NOT NULL, DEFAULT and CHECK constraints can be checked when the record is created or updated with the new values. If the CHECK constraint implemented by the DB server allows values outside of the record to be examined, every transaction that can have an affect on the check constraint has to update the constraint's record (so not the underlying one, but one that would be updated by any transaction which could affect the constraint), so that overlapping transactions will be guaranteed to not be committed simultaneously.

Unique

A UNIQUE constraint can be implemented using a redundant INDEX table. This is a special kind of record, which can only be updated and never created, even if no earlier record has been created yet for the specified set of values. That way, if a transaction tries to create a new record which would conflict with another one on a set of values, they would both leave an updated variant for it. Due to this, at most one of them will be chosen to be committed.

Primary Key

PRIMARY KEY is a combination of UNIQUE and NOT NULL.

Foreign Key

A foreign key is a collection of fields on a record (called the referrer), which (collectively) uniquely identify a (potentially different) record (the referee). The unique aspect of the referee record can be dealt with using a UNIQUE index, as described above. If a record is created in a table defined with the FOREIGN KEY constraint, it has to make sure that a record with these attributes exists in the referred table (or fail the transaction) and that this record is not updated by another transaction until the transaction finishes. This can be guaranteed by issuing a SELECT FOR UPDATE for it using its unique identifier. Once this is done, a record can be inserted to a redundant INDEX table, listing this FOREIGN KEY relationship between these records.

This record in the INDEX table can be deleted when the referrer record is deleted, or updated to a different (using the mechanism described above) referee if any of the referring fields is modified.

Index

Since indices are redundancies of the original transaction's data set, they will all either be chosen to be the next version or will be rejected together.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A distributed data store system, comprising a client and a plurality of computational devices arranged in a hierarchy, the hierarchy including a parent computational device and a plurality of child computational devices, wherein read processes from and write processes to said computational devices are non-blocking, wherein a reference version for the data for said read processes and said write processes is determined upon a request from the client, such that said reference version is read in a read process or written in a write process at a time of said request, characterized in that:

the parent computational device has a parent's clock determining a parent-clock value;

said plurality of child computational devices form a plurality of groups, each group having a group clock realized by rounds of clock token-messages sent between the child computational devices of the group in a circle, wherein the group clocks advance independently of each other and of the parent's clock, and wherein a group clock value of a group is determined on the basis of the clock token message last received in the group; and the system comprises associations of clock values, wherein in each association a group clock value is associated with one parent-clock value, wherein each of said associations is established by means of a value query message sent from the respective group of the child computational devices to the parent computational device;

wherein said reference version is determined based on strongly consistent ordering established from said associations, wherein said strongly consistent ordering is based on the following comparisons:

if two versions of a group clock are from the same group, group clock values associated with these versions are directly compared, and if the two versions of the group clock are from different groups, group clock values associated with these versions are compared based on a lowest common group clock.

2. The system of claim 1, wherein the client requests a data transformation and wherein before said data transformation is applied, said reference version is determined.

3. A method for operating a non-blocking data store with the distributed data store system of claim 1, comprising:
receiving the request from said client;
determining which computational devices have relevant versions of the data for said request;
determining said reference version according to said ordering of the relevant versions; and
performing said request from the client on said reference version.

4. The method of claim 3, wherein a plurality of write processes occur with regard to a shared data item or set of data items, wherein an order is established between any two of said plurality of write processes such that at least one write process is canceled.

5. The method of claim 3, wherein a plurality of write processes occur with regard to a shared data item or set of data items, wherein at least one write process is canceled such that only one write process operates on said shared data item or set of data items.

6. The method of claim 3, further comprising:
transferring said data for said request between said plurality of child devices;
determining a lowest version of said data for said request according to said transferring said data; and
transferring said lowest version to said parent device.

7. The method of claim 6, further comprising eliminating any earlier versions of said data for said request according to said transferring said data for said request between said plurality of child devices and said transferring said lowest version to said parent device.

8. The system of claim 1, wherein a plurality of computational devices have different versions of the data and wherein determining said reference version comprises determining which computational devices have relevant versions of the data and determining said reference version according to said ordering.

9. The system of claim 8, wherein said parent computational device is a member of a parent group of computational devices, said parent clock value also being a group clock value, each group clock defining an open period's value for the latest period, which will be closed by processing the next clock token-message.

10. The system of claim 9, wherein a child computational device sends a value query message to said parent computational device including the name of the sending computer and a group clock value created by said child computational device, and wherein said parent computational device processes the received message to return an associated group clock value if the received group clock value already has an associated parent-clock value, and alternatively, to return the currently open period and to assign the open period's value to all child computational device clock values of said parent computational device which are higher than the highest value already queried.

11. The system of claim 10, herein one or more relevant versions of the data that are earlier versions are eliminated from being selected as said reference version.

12. The system of claim 1, wherein said reference version is determined before a commitment process is performed.

13. The system of claim 1, wherein data is transferred as a message, and wherein each computational device comprises a queue, wherein upon receiving a new message, each child device updates said queue of each child device at a same level of the hierarchy that has not received said new message and also updates said queue of said parent device.

14. The system of claim 1, wherein the group clocks advance independently of each other and of the parent's clock such that read processes from and write processes to respective child computational devices in the group are non-blocking transactions that are committed without the use of a consensus protocol.

15. The system of claim 1, wherein the group clock value of the group is shared between the child computational devices in the group.

\* \* \* \* \*